(12) United States Patent
Inoue et al.

(10) Patent No.: US 8,953,533 B2
(45) Date of Patent: Feb. 10, 2015

(54) WIRELESS COMMUNICATION SYSTEM, BASE STATION, SERVER, WIRELESS COMMUNICATION METHOD, AND PROGRAM

(75) Inventors: Takamichi Inoue, Tokyo (JP); Kenji Koyanagi, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 13/257,809

(22) PCT Filed: Mar. 19, 2010

(86) PCT No.: PCT/JP2010/054784
§ 371 (c)(1),
(2), (4) Date: Sep. 20, 2011

(87) PCT Pub. No.: WO2010/116881
PCT Pub. Date: Oct. 14, 2010

(65) Prior Publication Data
US 2012/0026962 A1    Feb. 2, 2012

(30) Foreign Application Priority Data

Apr. 10, 2009 (JP) ................................. 2009-096493

(51) Int. Cl.
*H04W 72/04* (2009.01)
*H04W 40/00* (2009.01)
(Continued)

(52) U.S. Cl.
CPC ........ *H04L 27/2614* (2013.01); *H04L 27/2613* (2013.01); *H04L 5/0001* (2013.01); *H04L 5/003* (2013.01); *H04W 72/00* (2013.01)
USPC ........... 370/329; 370/330; 370/343; 370/344; 370/485; 375/130; 375/132; 375/260; 375/140; 455/450; 455/509

(58) Field of Classification Search
CPC .. H04W 72/04; H04W 74/0833; H04L 5/005; H04L 5/0007; H04L 5/0053; H04L 5/0048; H04L 27/2613
USPC ......... 370/342, 341, 252, 310–322, 328–335, 370/343–344; 455/456, 450, 509; 375/130, 375/132, 260
See application file for complete search history.

(56) References Cited

U.S. PATENT DOCUMENTS 7,529,179 B1 * 5/2009 Lee et al. ...................... 370/208
7,701,919 B2 * 4/2010 Ah Lee ......................... 370/344
(Continued)

FOREIGN PATENT DOCUMENTS

| JP | 2008508803 A | 3/2008 |
|---|---|---|
| WO | 2010047512 A2 | 4/2010 |
| WO | 2010087173 A1 | 8/2010 |

OTHER PUBLICATIONS

NEC Group, "Downlink Control Structure for Carrier Aggregation Approach in LTE-Advanced System," 3GPP TSG-RAN WG1 #54bis, R1-083491 (Sep. 29, 2008-Oct. 3, 2008), pp. 1-4.
(Continued)

*Primary Examiner* — Wutchung Chu
(74) *Attorney, Agent, or Firm* — Sughrue Mion, PLLC

(57) ABSTRACT

Provided is a wireless communication technique capable of supporting communication using a single component carrier, and communication using a plurality of component carriers. The communication using the plurality of carriers comprises a processing means for performing the signal processing in accordance with each of the carriers with respect to the common signal sequence used by the plurality of carriers. The present invention makes it possible to cope with the communication employing a single component carrier and the wireless communication employing a plurality of the component carriers. Further, PAPR of the reference signals can be made small because there is no possibility that the identical CAZAC sequence is used among the component carriers when a plurality of the component carriers are employed.

38 Claims, 14 Drawing Sheets

(51) Int. Cl.
  *H04W 76/00* (2009.01)
  *H04B 7/216* (2006.01)
  *H04B 7/00* (2006.01)
  *H04B 1/00* (2006.01)
  *H04L 27/26* (2006.01)
  *H04L 5/00* (2006.01)
  *H04W 72/00* (2009.01)

(56) References Cited

U.S. PATENT DOCUMENTS

| | | | | |
|---|---|---|---|---|
| 7,821,991 | B2 * | 10/2010 | Iwai et al. | 370/328 |
| 8,213,523 | B2 * | 7/2012 | Birru et al. | 375/260 |
| 8,441,991 | B2 * | 5/2013 | Papasakellariou et al. | 370/329 |
| 2007/0087749 | A1 * | 4/2007 | Ionescu et al. | 455/436 |
| 2007/0230600 | A1 * | 10/2007 | Bertrand et al. | 375/260 |
| 2008/0043879 | A1 * | 2/2008 | Gorokhov et al. | 375/296 |
| 2008/0080439 | A1 * | 4/2008 | Aziz et al. | 370/338 |
| 2008/0267137 | A1 * | 10/2008 | Dabak et al. | 370/336 |
| 2009/0028065 | A1 * | 1/2009 | Iwai et al. | 370/252 |
| 2009/0060004 | A1 * | 3/2009 | Papasakellariou et al. | 375/140 |
| 2009/0080500 | A1 * | 3/2009 | Muharemovic et al. | 375/146 |
| 2009/0097457 | A1 * | 4/2009 | Papasakellariou et al. | 370/336 |
| 2009/0161650 | A1 * | 6/2009 | Imamura et al. | 370/342 |
| 2009/0168730 | A1 * | 7/2009 | Baum et al. | 370/336 |
| 2009/0186625 | A1 * | 7/2009 | Qu et al. | 455/450 |
| 2010/0099423 | A1 * | 4/2010 | Ogawa et al. | 455/450 |
| 2010/0111142 | A1 * | 5/2010 | Iwai et al. | 375/146 |
| 2010/0265898 | A1 * | 10/2010 | Chun et al. | 370/329 |

OTHER PUBLICATIONS

Office Action issued Feb. 8, 2013 from the Korean Intellectual Property Office in counterpart Korean application No. 10-2011-7021440.

"Resolving CM and Cell ID Issues Associated with Aggregated Carriers", Texas Instruments, Jan. 12, 2009, 3GPP TSG RAN WG1#55bis R1-090281.

"DL Layered Control Signal Structure in LTE-Advanced", NTT DOCOMO, Sep. 29, 2008, 3GPP TSG RAN WG1 Meeting #54bis R1-083681.

"Generalized Chirp-Like Polyphase Sequences with Optimum Correlation Properties", IEEE, Jul. 1992, pp. 1406-1409, vol. 38, No. 4.

International Search Report for PCT/JP2010/054784 dated Jul. 6, 2010.

Takamichi Inoue et al., "Proposal on Generation method of Reference Signal in LTE-Advanced Uplink", The Institute of Electronics, Infromation and Communication Engineers, Dec. 10, 2009, vol. 109, No. 341, 7 pages total, RCS2009-188.

NEC Group, "Mapping of UL RS sequence for clustered DFT-S-OFDM", 3GPP TSG RAN WG1 Meeting #58bis R1-093865, Oct. 12, 2009, pp. 1 to 4.

Catt, "DL Control Channel Scheme for LTE-A [online]", 3GPP TSG RAN WG1 Meeting #56bis, R1-091524, Internet <URL: http://www.3gpp.org/ftp/tsg_ran/WG1_RL1/TSGR1_56b/Docs/R1-091524.zip>, Mar. 27, 2009; 5 pages total.

Zte, "CM reduction for Aggregated DL RS [online] ", 3GPP TSG-RAN WG1 Meeting #56bis, R1-091428, Internet <URL:http://www.3gpp.org/ftp/tsg_ran/WG1_RL1/TSGR1_56b/Docs/R1-091428.zip>, Mar. 27, 2009; 5 pages total.

Takamichi Inoue et al., "Performance Evaluation on Cubic Metric of Reference Signal in Discontinuous Spectrum Transmission", The Institute of Electronics, Information and Communication Engineers, Sep. 2, 2008, 3 pages total, B-5-21.

Communication dated Oct. 30, 2013, issued by the Japan Patent Office in counterpart Japanese Application No. 2011-508316.

* cited by examiner

CAZAC SEQUENCE SUBJECTED TO DFT (SEQUENCE LENGTH L)

CAZAC SEQUENCE SUBJECTED TO CYCLIC EXTENSION (SEQUENCE LENGTH L+2)

WIRELESS COMMUNICATION SYSTEM, BASE STATION, SERVER, WIRELESS COMMUNICATION METHOD, AND PROGRAM

CROSS REFERENCE TO RELATED APPLICATIONS

This application is a National Stage of International Application No. PCT/JP2010/054784 filed on Mar. 19, 2010, which claims priority from Japanese Patent Application No. 2009-096493, filed on Apr. 10, 2009, the contents of all of which are incorporated herein by reference in their entirety.

TECHNICAL FIELD

The present invention relates to a signal processing of wireless communication employing a plurality of carriers.

BACKGROUND ART

The access technique of an uplink of Long Term Evolution (LTE), of which standardization in 3rd Generation Partnership Project (3GPP) is in a convergence phase, adopts Single Carrier-Frequency Division Multiplexing Access (SC-FDMA). Additionally, with a configuration of transmitter for performing a subcarrier mapping in a frequency domain, the above access technique is also referred to as Discrete Fourier Transform-Spread-Orthogonal Frequency Division Multiplexing (DFT-S-OFDM).

As the reason why SC-FDMA is adopted, it can be listed that coverage can be enlarged because Peak to Average Power Ratio (PAPR) is small. Additionally, with the allocation of resource blocks in SC-FDMA, only the resource blocks (RB) that are continuous in a frequency axis are allocated. Herein, the resource block is configured of a plurality of subcarriers, and one resource block is configured of 12 subcarriers in LTE.

A Constant Amplitude Zero Auto-Correlation (CAZAC) sequence characterized in that PAPR is small is adopted as reference signals of the LTE uplink. The CAZAC sequence is a sequence of which amplitude is constant in both the time domain and the frequency domain, and yet of which an auto correlation value is zero except for a phase difference being zero. PAPR of the CAZAC sequence is suppressed at a small level because the amplitude is constant in the time domain, and yet the CAZAC sequence is suitable for estimating channels in the frequency domain because the amplitude is constant also in the frequency domain. The sequence number of the CAZAC sequence depends upon a sequence length thereof. For example, there exists a Zadoff-Chu sequence that is represented by Equation 1 adopted in LTE as one of the CAZAC sequences (see Non-Patent literature 1).

$$c_q^L(n) = \exp(-j\pi qn(n+1)/L) \, n=0,\ldots,L-1 \quad \text{(Equation 1)}$$

In the Zadoff-Chu sequence, it is when the sequence length becomes a prime number L that the sequence number is maximized, and the sequence length thereof becomes L−1. In LTE, the sequence obtained by subjecting the Zadoff-Chu sequence having a prime number length to cyclic extension is employed in order to secure the sequence number of the CAZAC sequence. As shown in FIG. 1, the cyclic extension technique is a technique of extending the sequence length of the Zadoff-Chu sequence in the frequency domain to the number of the subcarriers of data signals. Employing the cyclic extension technique makes it possible to secure many kinds of the sequence lengths without largely damaging properties of the above-described CAZAC sequence. Hereinafter, the reference signal sequence to be employed for LTE is described as the CAZAC sequence.

The specification of LTE specifies 30 kinds of CAZAC sequence groups including the CAZAC sequence each having a different sequence length, and allocates one CAZAC sequence group in each cell. Additionally, when the CAZAC sequence group differs, the different CAZAC sequence is employed without fail because one CAZAC sequence belongs only to one certain CAZAC sequence group. Further, in the current situation, the sequence length that the CAZAC sequence groups support is 20 MHz, being a maximum bandwidth of LTE, or less.

Non-PATENT LITERATURE 1: B. M. Popovic, "Generalized Chirp-Like Polyphase Sequences with Optimum Correlation Properties," IEEE Tansactions on Information Theory, Vol. 38, No. 4, pp 1406-1409, July 1992.

SUMMARY OF INVENTION

Technical Problem

Currently, in 3GPP, the standardization of LTE-Advanced, being a next generation of LTE, is in progress, and the downlink of 1 Gbps or so and the uplink of 500 Mbps or so are required as a maximum communication speed of LTE-Advanced. For this reason, LTE-Advanced demands a system bandwidth wider than 20 MHz of LTE. Thereupon, a technology of aggregating component carries (they are also called carriers, and the bandwidth thereof is 20 MHz at maximum) employed in LTE in plural number, which is called carrier aggregation, is employed.

It has been agreed in LTE-Advanced that a physical channel configuration common to LTE is employed. Thus, in the physical channel configuration of the LTE-Advanced uplink, as shown in FIG. 13, Physical Uplink Control Channel (PUCCH) to be employed for transmitting control signals is located in both ends of the component carrier. This causes Physical Uplink Shared Channel (PUSCH) being employed for transmitting data to employ the resource blocks that are discontinuous in the frequency axis. From the background described above, the access technique of the LTE-Advanced uplink employs N×DFT-S-OFDM employing a plurality of DFTs in the case of the communication employing a plurality of the component carriers (carrier aggregation). Where, N is the number of the component carriers that are aggregated.

Further, the uplink access technique within one certain component carrier for performing the carrier aggregation is expanded so that an allocation of the resource blocks that are discontinuous in the frequency axis is enabled in order to enhance a multiuser diversity effect by a channel-dependent scheduling method. Herein, the so-called channel-dependent scheduling method is a method of allocating the resource blocks to user equipments that are excellent in a channel quality of the frequency domain in an environment of becoming a frequency-selective fading channel. That is, while the above method employs one DFT within one component carrier similarly to LTE, it employs Clustered DFT-S-OFDM capable of allocating resource blocks that are discontinuous in the frequency axis.

Further, it needs to be listed as a request condition of the LTE-Advanced system that LTE-Advanced base stations also support LTE user equipments that correspond only to the access technique of SC-FDMA. That is, it is necessary for the LTE user equipments to be able to make communication in any cell of the LTE-Advanced base station and LTE base station without causing a problem.

When the system for performing wideband transmission by employing the carrier aggregation is configured to repeatedly employ the identical reference signal sequence for a plurality of the component carriers so that the user equipments or the base stations as well for making communication by employing a single component carrier are caused to cope, a problem that PAPR becomes large surfaces. The reason is that the case of performing coherent addition for the identical signal occurs because the reference signal to be employed in each component carrier is identical.

An object of the present invention is to provide a wireless communication technology that can cope with the communication employing a single component carrier, and the communication employing a plurality of component carriers.

Solution to Problem

The present invention for solving the above-mentioned problems is a wireless communication system, which is characterized in including a processing means for, in communication employing a plurality of carriers, performing a signal processing responding to each carrier for a common signal sequence that is employed in the aforementioned plurality of carriers.

The present invention for solving the above-mentioned problems is a base station, which is characterized in including a processing means for, in communication employing a plurality of carriers, performing a signal processing responding to each carrier for a common signal sequence that is employed in the aforementioned plurality of carriers.

The present invention for solving the above-mentioned problems is a terminal, which is characterized in including a processing means for, in communication employing a plurality of carriers, performing a signal processing responding to each carrier for a common signal sequence that is employed in the aforementioned plurality of carriers.

The present invention for solving the above-mentioned problems is a wireless communication method, which is characterized in including a processing step of, in communication employing a plurality of carriers, performing a signal processing responding to each carrier for a common signal sequence that is employed in the aforementioned plurality of carriers.

The present invention for solving the above-mentioned problems is a program of a base station, which is characterized in causing the aforementioned base station to execute, in communication employing a plurality of carriers, a signal processing responding to each carrier for a common signal sequence that is employed in the aforementioned plurality of carriers.

The present invention for solving the above-mentioned problems is a program of a terminal, which is characterized in causing the aforementioned terminal to execute, in communication employing a plurality of carriers, a signal processing responding to each carrier for a common signal sequence that is employed in the aforementioned plurality of carriers.

Advantageous Effect of Invention

The present invention makes it possible to cope with the communication employing a single component carrier and the wireless communication employing a plurality of the component carriers.

DESCRIPTION OF EMBODIMENTS

Next, the wireless communication system in accordance with the present invention will be explained by making a reference to the accompanied drawings.

(First Exemplary Embodiment)

The first exemplary embodiment of the present invention is characterized in employing a CAZAC sequence common to the component carriers, and adding a different phase offset for each of the component carriers.

Figure 2:
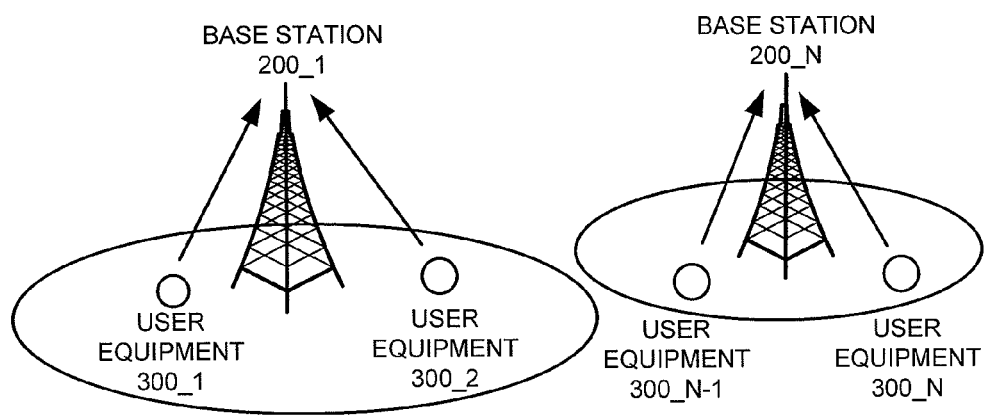
FIG. 2 is a schematic view of the system of the present invention.
Figure 3:
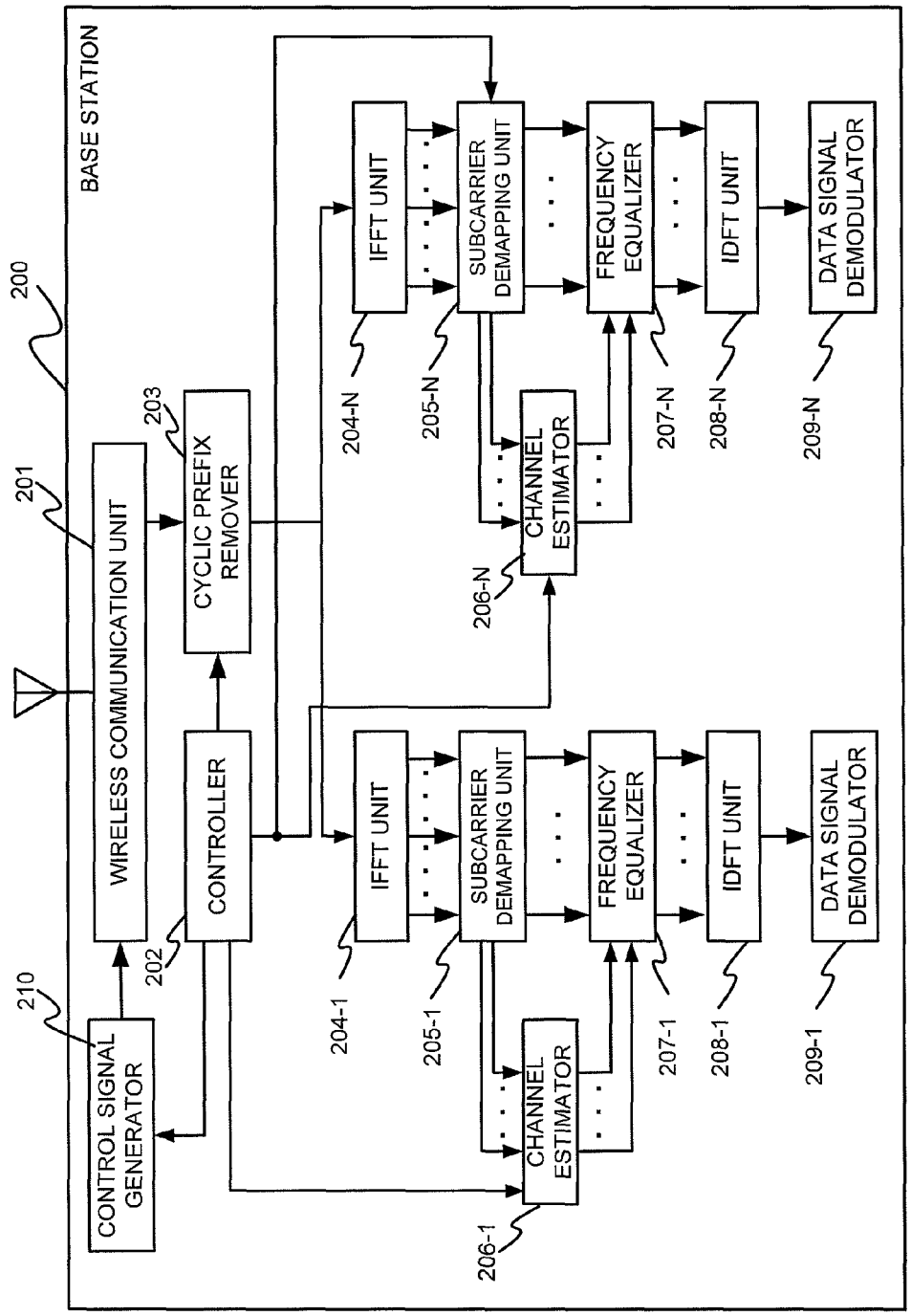
FIG. 3 is a block diagram illustrating a main configuration of the base station in the wireless communication system for which a first exemplary embodiment has been applied.

FIG. 2 is a schematic view of the wireless communication system of the present invention. As shown in FIG. 2, the wireless communication system of the present invention includes a plurality of base stations and a plurality of user equipments (UE). Whiles two base stations and two user equipments are described in FIG. 2, respectively, the number of the base stations and the number of the user equipments are not limited hereto, and it is enough that the wireless communication system includes at least one base station and at least one user equipment, respectively. FIG. 3 is a block diagram illustrating a schematic configuration of the base station in the first exemplary embodiment of the present invention. Herein, an example of the case that the number of the component carries for performing the carrier aggregation is N is shown.

The base station 200 includes a wireless communication unit 201, a controller 202, a cyclic prefix remover 203, IFFT units 204, subcarrier demapping units 205, channel estimators 206, frequency equalizers 207, IDFT units 208, data signal demodulators 209, and a control signal generator 210.

The wireless communication unit 201 of the base station 200 receives the reference signals and the data signals coming from the user equipments. The wireless communication unit 201 outputs the received reference signals and data signals to the cyclic prefix remover 203. Additionally, while explanation is made hereinafter by mainly supposing demodulation reference signals, the signals could be other signals such as Sounding reference signals and RACH (Random Access Channel) preambles.

The controller 202 controls the cyclic prefix remover 203, the subcarrier demapping units 205-1 to 205-N, channel estimators 206-1 to 206-N and the control signal generator 210, respectively. The controller 202 notifies the CAZAC sequence group indexes being employed in its own station to the control signal generator 210. With a configuration in which the base stations notify the phase offsets to the user equipments, the controller 202 notifies information associated with the phase offsets to the control signal generator 210.

The cyclic prefix remover 203 removes cyclic prefixes based upon information such as cyclic prefix lengths inputted from the controller 202, and outputs the signals for each signal of the component carrier to the IFFT units 204-1 to 204-N, respectively.

The IFFT units 204-1 to 204-N convert the signals of the time domain into the signals of the frequency domain, and input the converted signals into the subcarrier demapping units 205-1 to 205-N, respectively.

The subcarrier demapping unit 205-1 to 205-N recover the mapped subcarriers to an original state by employing subcarrier mapping information inputted from the controller 202, and outputs the reference signals to the channel estimators 206-1 to 260-N, and the data signals to the frequency equalizers 207-1 to 207-N, respectively The channel estimators 206-1 to 260-N multiply the received reference signal sequence by a conjugate of the notified reference signals by employing the CAZAC sequence group and the phase offset inputted from the controller 202. With it, the channel estimators 206-1 to 260-N estimate frequency response characteristics of the channel and input the estimated frequency response characteristics of the channel into the frequency equalizers 207-1 to 207-N.

The frequency equalizers 207-1 to 207-N perform frequency domain equalization for compensating a fluctuation in the amplitude and a fluctuation in the phase due to the fading of the channel by employing the inputted data signals and frequency response characteristics of the channel, and output an equalization result to the IDFT units 208-1 to 208-N.

The IDFT units 208-1 to 208-N convert the signals of the frequency domain into the signals of the time domain, and output the converted signals to the data signal demodulators 209-1 to 209-N.

The data signal demodulators 209-1 to 209-N demodulate the data signals transmitted by respective component carriers.

The control signal generator 210 generates the control signals based upon information associated with the CAZAC sequence group that is employed for the reference signals of the uplink inputted from the controller 202, and resource allocation information associated with the resource allocation. The generated control signals are transmitted to the user equipments via the wireless communication unit 201. The resource allocation information includes information of the component carriers to be used, and allocation information indicative of the allocation of the resources in each component carrier. Further, With a configuration in which the base stations notify the phase offsets to the user equipments, the control signal generator 210 generates the control signals based upon information associated with the phase offsets, information associated with the CAZAC sequence groups, and resource allocation information associated with the resource allocation. With the CAZAC sequence group, the CAZAC sequences of which the sequence length differs for each CAZAC sequence group are specified. That is, one CAZAC sequence belongs only to one certain CAZAC sequence group. Thus, it follows that when the CAZAC sequence group differs, the different CAZAC sequence is employed without fail. In such a manner, while the case of employing the CAZAC sequence groups in conformity to the specification of LTE is explained in the following, a configuration in which the base stations notify the CAZAC sequence being used to the user equipments may be employed in some case, and the CAZAC sequence being used may be previously stored in a storage unit of a CAZAC sequence number generator 304 to be described later in some cases.

Figure 4:
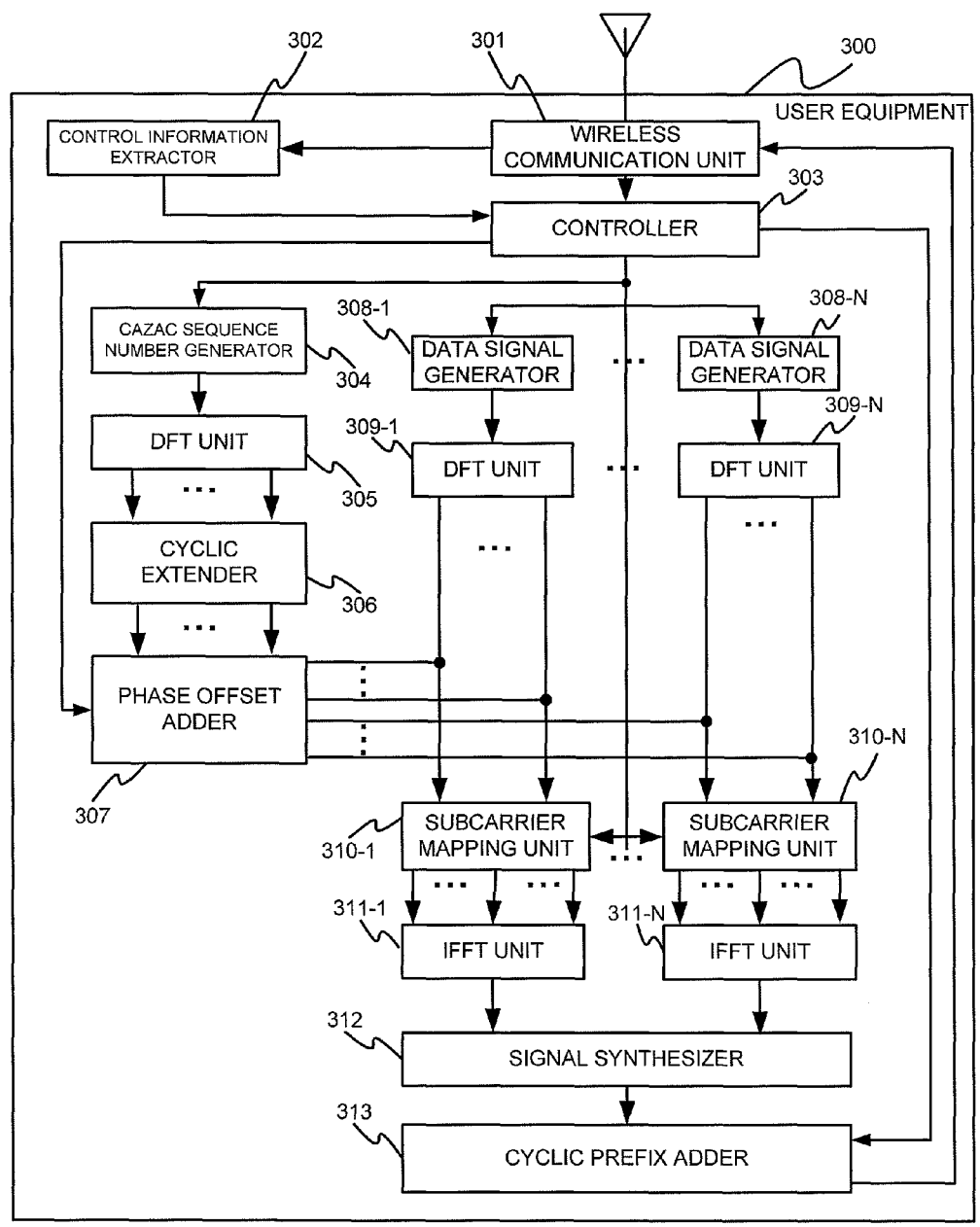
FIG. 4 is s a block diagram illustrating a main configuration of the user equipment in the wireless communication system for which the first exemplary embodiment has been applied.

FIG. 4 is a block diagram illustrating a schematic configuration of the user equipment in the first exemplary embodiment. Herein, an example of the case that the number of the component carries for performing the carrier aggregation is N is shown.

In FIG. 4, a user equipment 300 includes a wireless communication unit 301, a control information extractor 302, a controller 303, a CAZAC sequence number generator 304, a DFT unit 305, a cyclic extender 306, a phase offset adder 307, data signal generators 308, DFT units 309, subcarrier mapping units 310, IFFT units 311, a signal synthesizer 312, and a cyclic prefix adder 313.

The wireless communication unit 301 outputs the downlink control signals received from the base stations 200 to the control information extractor 302.

The control information extractor 302 extracts the information associated with the CAZAC sequence groups, and the resource allocation information associated with the resource allocation, and outputs the extracted information to the controller 303. With a configuration in which the base stations notify the phase offsets to the user equipments, the control information extractor 302 extracts information as well associated with the phase offsets.

The controller 303 controls the CAZAC sequence number generator 304, the cyclic extender 306, the phase offset adder 307, the data signal generators 308-1 to 308-N, the subcarrier mapping units 310-1 to 310-N, and the cyclic prefix adder 313, respectively.

The CAZAC sequence number generator 304 generates the CAZAC sequence number to be employed for the reference signals for each component carrier, according to the information associated with the CAZAC sequence groups and the resource allocation information inputted from the controller 303, and outputs the CAZAC sequence number to the DFT unit 305. The CAZAC sequence number generator 304 can grasp the number of the resource blocks allocated to its own terminal component carrier by component carrier from the resource allocation information. With LTE, when it is assumed that the number of the resource blocks allocated to a certain component carrier is n, it follows that the sequence length of the reference signals corresponding to the bandwidth of the data signals is 12×n=12n because one resource block is configured of 12 subcarriers. Thus, the CAZAC sequence number generator 304 generates the CAZAC sequence number defined as the sequence length being 12n by the CAZAC sequence group index inputted from the controller 303. For example, upon explaining by employing the sequences shown in the Non-Patent Literature 1 on the assumption that the number of the resource blocks allocated to a certain component carrier is 3, the number of the subcarriers of the data signals is 12n, namely, 12×3=36, whereby the CAZAC sequence number generator 304 generates CAZAC sequence of which the sequence length is L=31, being a maximum prime number of 36. At this time, the sequence number is 31−1=30 because the sequence number is (the sequence length −1).

The DFT unit 305 converts the signals of the time domain into the signals of the frequency domain, and outputs the converted signals to the cyclic extender 306.

Figure 1:
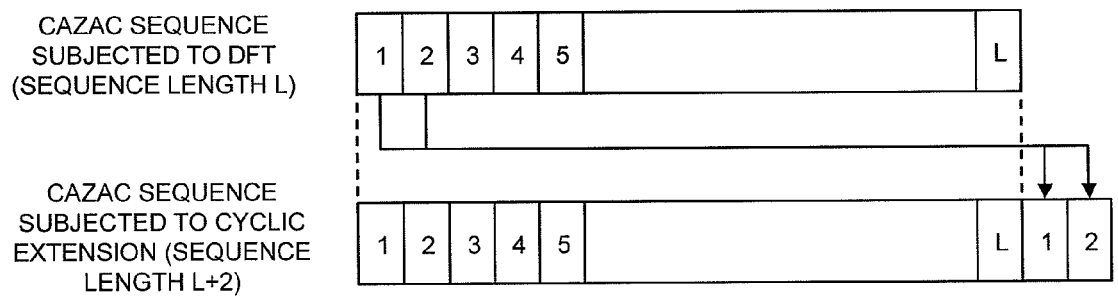
FIG. 1 is a view for explaining the cyclic extension.

The cyclic extender 306 outputs the reference signals, being the CAZAC sequences expanded for each component carrier to the number of the subcarriers of the data signals by employing the CAZAC sequences generated by the CAZAC sequence number generator 304, to the phase offset adder 307. The sequence length of the data signals can be grasped from the resource allocation information inputted from the controller 303. For example, when it is assumed that the number n of the resource blocks allocated to a certain component carrier is three, the number of the subcarriers of the data signals, as described above, is 36. As also shown in FIG. 1, the cyclic extender 306 expands the number of the subcarriers so that it becomes 36 by employing the CAZAC sequence generated by the CAZAC sequence number generator 304, of which the sequence length is 31. Additionally, while this explanation is made by employing a configuration of notifying the CAZAC sequence number via the CAZAC sequence number generator 304 and the DFT units 305, a configuration of notifying the CAZAC sequence number from the controller 303 may be employed.

The phase offset adder 307 outputs the reference signals to which the phase offset has been added based upon the phase offset information for each component carrier to be inputted from the controller 303 to the subcarrier mapping units 310-1 to 310-N, respectively. Additionally, the CAZAC sequences subjected to the cyclic extension in the frequency domain may be previously stored in a storage unit of the CAZAC sequence number generator 304. In this case, the DFT unit 305 and the cyclic extender 306 are unnecessary. Further, while this explanation is made by employing a configuration of notifying the phase offset information from the controller 303, a configuration of notifying the phase offset information via the CAZAC sequence number generator 304, the DFT unit 305 and the cyclic extender 306 may be employed.

The data signal generators 308-1 to 308-N generate the data for each component carrier under control of the controller 303, and output the data to the DFT units 309-1 to 309-N, respectively.

The DFT units 309-1 to 309-N convert the data signals of the time domain into the data signals of the frequency domain, and input the converted signals into the subcarrier mapping units 310-1 to 310-N, respectively.

The subcarrier mapping units 310-1 to 310-N map the data signals and the reference signals to the subcarriers by employing the information associated the resource allocation inputted from the controller 303, and output to the IFFT units 311-1 to 311-N, respectively. Herein, Clustered DFT-S-OFDM, differently from SC-FDMA, can map the signals to the subcarriers as well that are discontinuous in the frequency axis.

The IFFT units 311-1 to 311-N convert the signals of the frequency domain into the signals of the time domain, and output the converted signals to the signal synthesizer 312.

The signal synthesizer 312 synthesizes the generated signals for each component carrier, and outputs the synthesized signals to the cyclic prefix adder 313.

The cyclic prefix adder 313 adds the cyclic prefixes under control of the controller 303. Thereafter, the cyclic prefix adder 313 transmits the generated signals to the base stations via the wireless communication unit 301.

Figure 5:
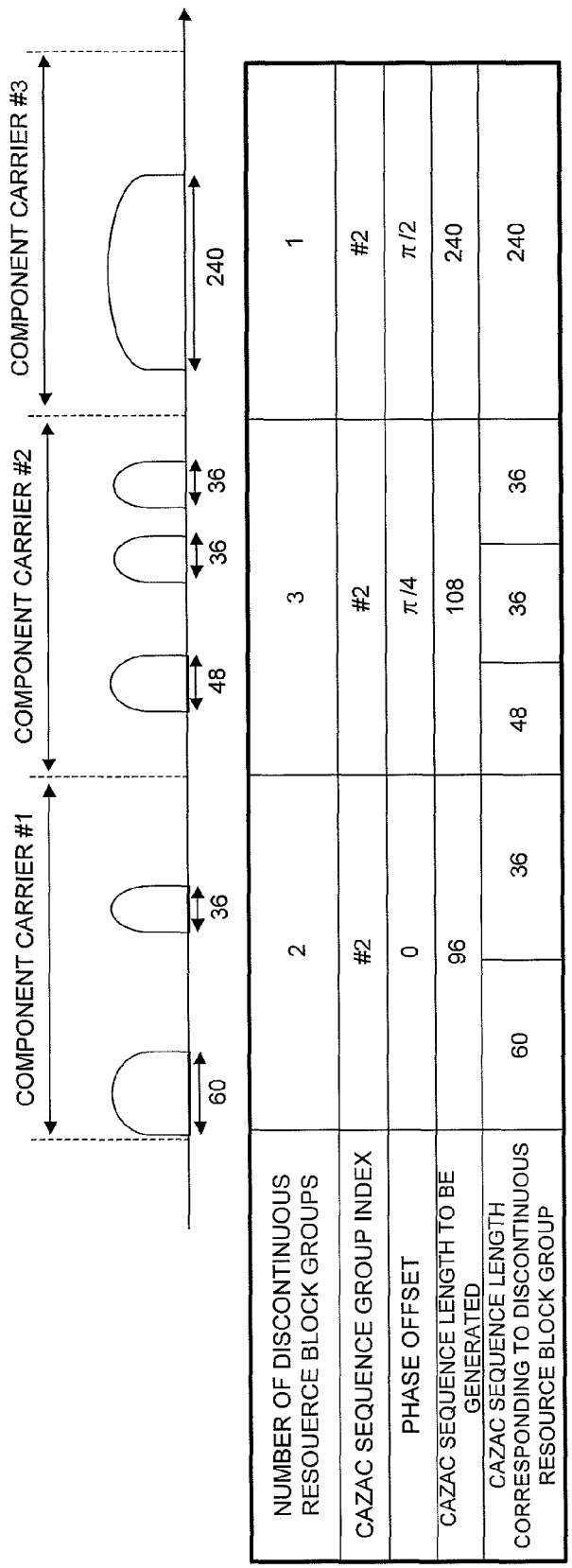
FIG. 5 is a view illustrating the method of transmitting the CAZAC sequences in the first exemplary embodiment.
Figure 15:
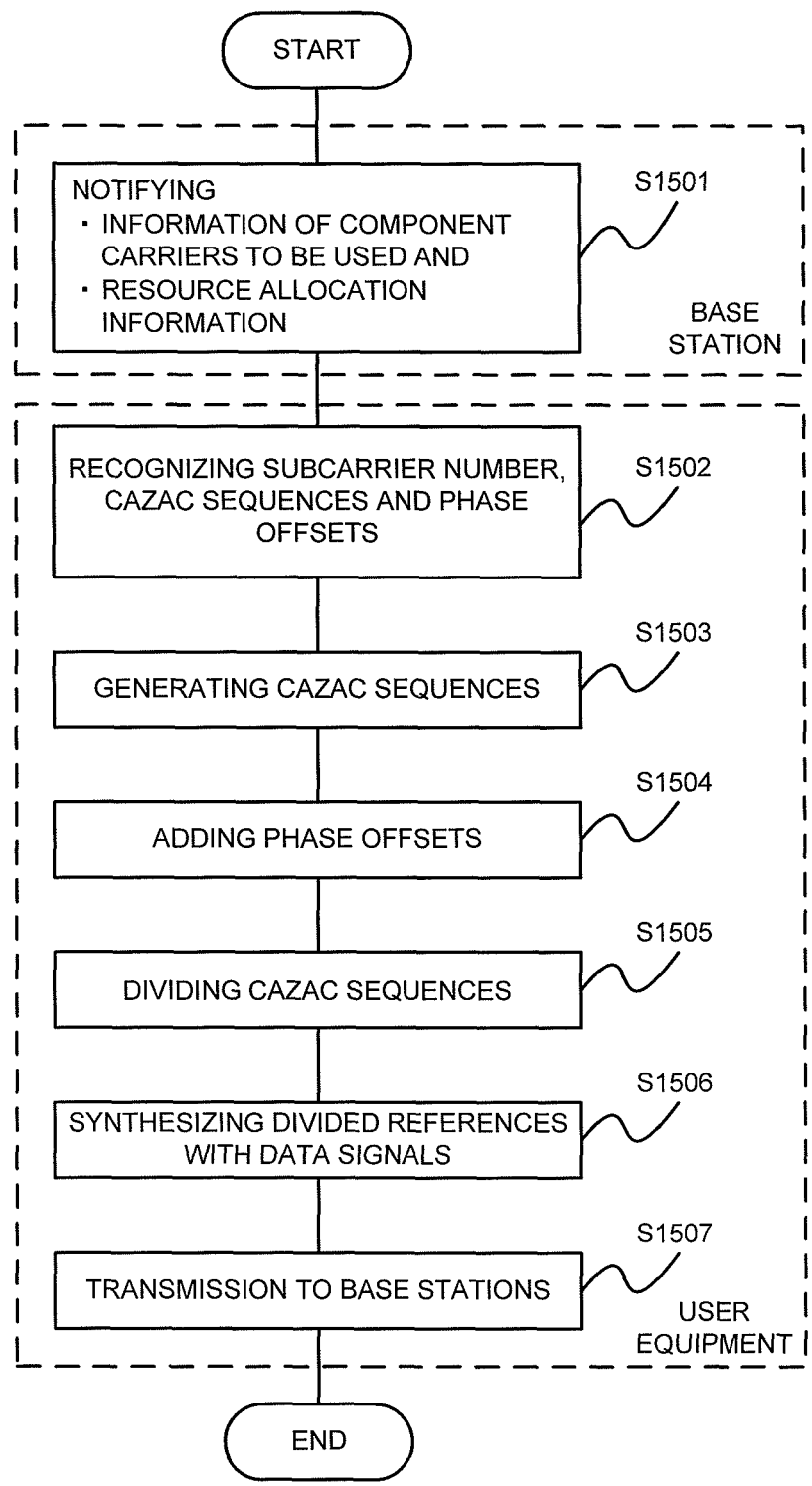
FIG. 15 is a flowchart for explaining an operation of the first exemplary embodiment.

Next, an operation of transmitting the CAZAC sequences associated with the first exemplary embodiment will be explained by employing FIG. 5 and FIG. 15.

The control signal generator 210 of the base stations writes down the information associated with the CAZAC sequence groups and the resource allocation information associated with the resource allocation into the control signals, and transmits them (step S1501). Additionally, with a configuration in which the base stations notify the phase offsets to the user equipments, the control signal generator 210 writes down the information associated with the phase offsets, the information associated with the CAZAC sequence groups and the resource allocation information associated with the resource allocation into the control signals.

The user equipments recognize the number of the subcarriers, the CAZAC sequences and the phase offsets (step S1502). Herein, the user equipments recognize that control information received from the base stations indicates that three component carriers #1 to #3 are used in the carrier aggregation. Further, it is assumed that the user equipments has recognized from the resource allocation information that two discontinuous resource block groups of which the continuous resource blocks are 5 and 3 have been allocated to the component carrier #1. Likewise, it is assumed that the user equipments has recognized that three discontinuous resource block groups of which the continuous resource blocks are 4, 3 and 3 have been allocated to the component carrier #2, and one discontinuous resource block group of which the continuous resource block is 20 has been allocated to the component carrier #3. Further, it is assumed that the CAZAC sequence group index of #2 has been sent by the base stations in order to employ the CAZAC sequence group index (group number) of #2 that is common to all of the component carriers. However, the phase offset is added to the reference signals for each component carrier by the phase offset adder 307. It is assumed that the phase offset is zero with the component carrier #1, the phase offset is $\pi/4$ with the component carrier #2, and the phase offset is $\pi/2$ with the component carrier #3. Additionally, the setting of the phase offset will be explained in details in the examples described below.

Specifically, a total of the subcarrier number of the component carrier #1 becomes 96 because the resource block of which the subcarrier number is 60 and the resource block of which the subcarrier number is 36 haven been allocated to the component carrier #1. Thus, the subcarrier number of the data signals becomes 96, and the user equipments generate the CAZAC sequence with a sequence length 96 defined within the group of the CAZAC sequence group index #2 (step S1503). And, while the user equipments perform the processing of adding the phase offsets to the CAZAC sequences (step S1504), they do not add the phase offset with #1. And, the user equipments divide the reference signal, being the generated CAZAC sequence, into the sequence with a sequence length 60 and the sequence with a sequence length 36 (step S1505).

And, the user equipments synthesize the divided sequences with the data signals (step S1506) and transmit the synthesized signals in an identical band (step S1507). At this time, the data signals and the reference signals are subjected to Time Division Multiplexing (TDM).

With the component carrier #2, the user equipments generate the CAZAC sequence with a sequence length 108 defined within the group of the CAZAC sequence group index #2 because the subcarrier number becomes 108 (step S1503). And, after adding the phase offset of $\pi/4$ to the CAZAC sequence (step S1504), the user equipments divide the CAZAC sequence into the sequence with a sequence length 48, the sequence with a sequence length 36, and the sequence with a sequence length 36 (step S1505). And, the user equipments synthesize the divided sequences with the data signals (step S1506), and transmit the synthesized signals in an identical band (step S1507).

Further, with the component carrier #3, the user equipments generate the CAZAC sequences with a sequence length 240 defined within the group of the CAZAC sequence group index #2 because the subcarrier number becomes 240 (step S1503). And, after adding the phase offset of $\pi/2$ to the CAZAC sequence (step S1504), the user equipments divide the sequence (step S1505). The user equipments synthesize the sequence with the data signals without dividing it because no discontinuous resource block group exists in the component carrier #3 (step S1506), and transmit the synthesized signals in an identical band (step S1507).

Example 1

The example 1 of the first exemplary embodiment will be explained below. The example 1 notifies the CAZAC sequence groups to be used and the information associated with the phase offsets, through the control signals of respective component carriers. For example, the control signal generator 210 of the base station 200 writes down the CAZAC sequence group indexes to be commonly used among the component carriers, and the phase offsets to be employed in respective component carriers into the control signals that are transmitted with the resource of Physical Downlink Shared Channel (PDSCH) to be designated by Physical Broadcast Channel (PBCH).

Figure 6:
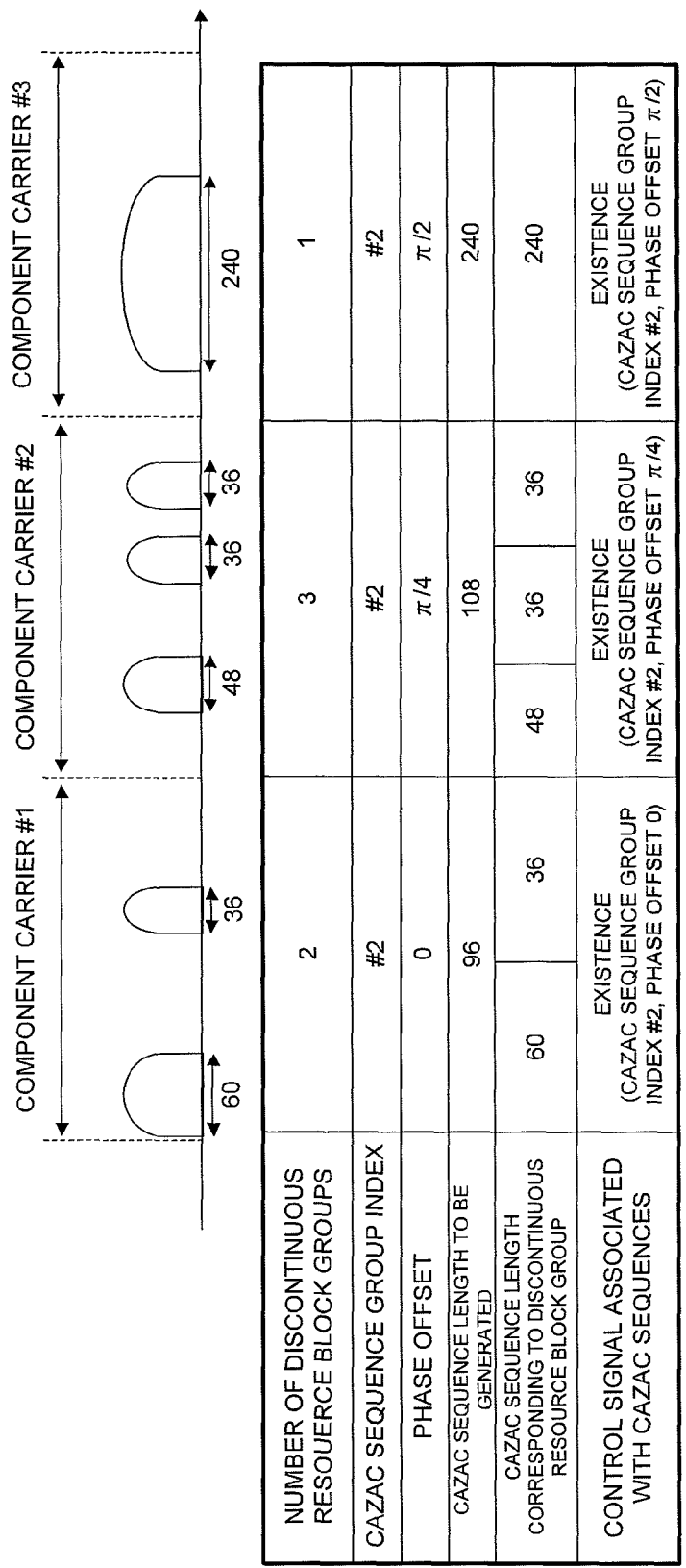
FIG. 6 is a view illustrating the method of transmitting control signals associated with transmission of the CAZAC sequences of an example 1 in the first exemplary embodiment.

The example 1 will be specifically explained by employing FIG. 6. In the example 1, the CAZAC sequence group indexes and the phase offsets are notified in respective component carriers. For example, #2, being the CAZAC sequence group index to be commonly used, and the phase offsets 0, $\pi/4$, and $\pi/2$ of respective component carriers are notified in the component carriers #1, #2 and #3, respectively.

The control information extractor 302 of the user equipment 300 recognizes the component carriers #1 to #3 that are used in its own station, and extracts #2, being the CAZAC sequence group index, and the phase offset of each component carrier for each component carrier. That is, the control information extractor 302 extracts the CAZAC sequence group index #2 and the phase offset 0 in the component carrier #1, the CAZAC sequence group index #2 and the phase offset $\pi/4$ in the component carrier #2, and the CAZAC sequence group index #2 and the phase offset $\pi/2$ in the component carrier #3, and notifies them to the controller 303.

The example 1 is high in commonality with LTE in all of the component carriers. The user equipments of LTE, which employ the CAZAC sequence group index to be notified in each component carrier, do not add the phase offsets. The problem that PAPR is increased does not occur because the user equipments of LTE do not perform the carrier aggregation.

Example 2

The example 2 of the first exemplary embodiment will be explained below. The example 2 notifies information associated with the CAZAC sequence groups to be used and the phase offsets, through one certain component carrier. For example, the control signal generator 210 of the base station 200 writes down the CAZAC sequence group indexes to be commonly used among the component carriers, and the phase offsets to be employed in respective component carriers into the control signals that are transmitted with the resources of PBCH of one certain component carrier or the resources of PDSCH to be designated by PBCH.

Figure 7:
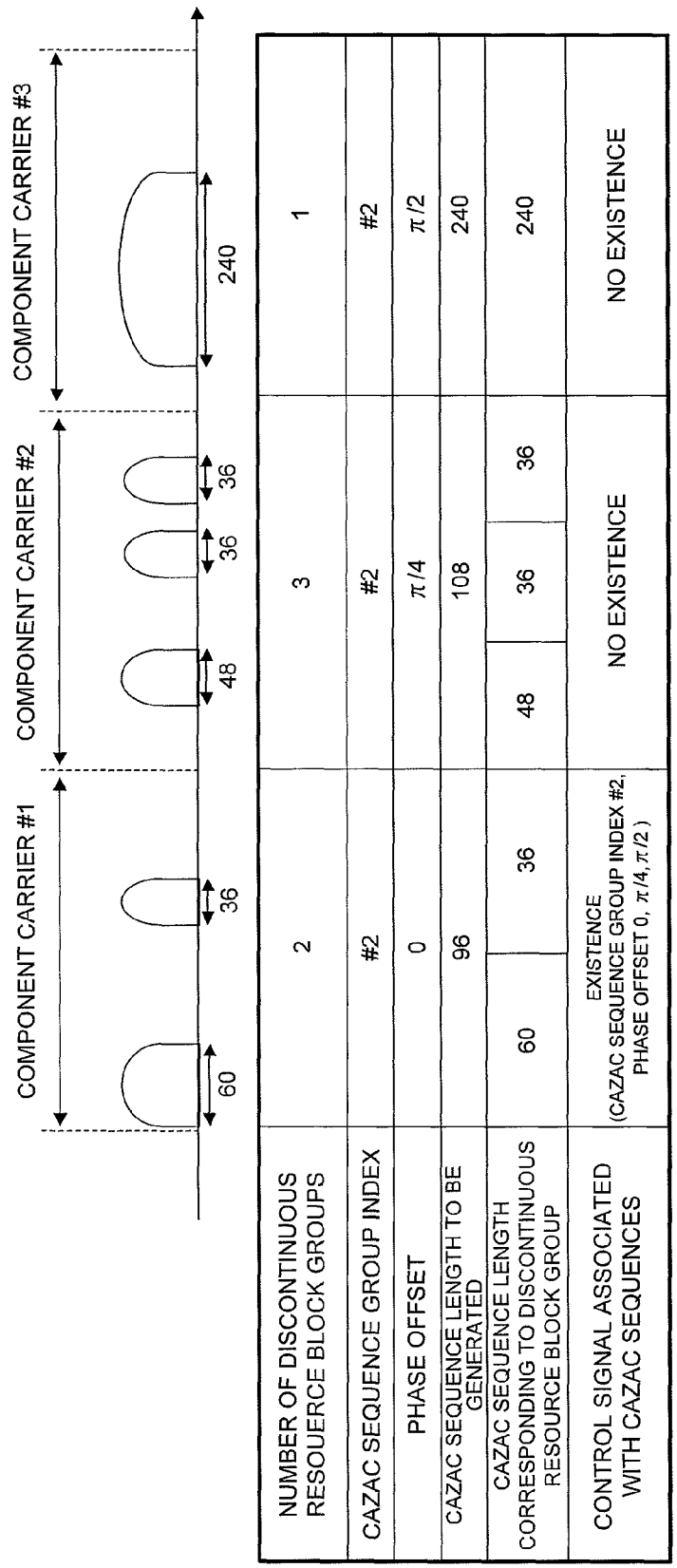
FIG. 7 is a view illustrating the method of transmitting control signals associated with transmission of the CAZAC sequences of an example 2 in the first exemplary embodiment.

The example 2 will be specifically explained by employing FIG. 7. Herein, the case of transmitting the control signals with the component carrier #1 is explained. Thus, the example 2 notifies #2, being the CAZAC sequence group index that is used in the component carriers #1, #2 and #3, and the phase offsets 0, $\pi/4$ and $\pi/2$ of respective component carriers, through PDSCH of the component carrier #1.

The control information extractor 302 of the user equipment 300 recognizes the component carriers #1 to #3 that are used in its own station, and extracts #2, being the CAZAC sequence group index, and the phase offsets of respective component carriers from the control signals of the component carrier #1. That is, with the component carrier #1, the control information extractor 302 extracts the CAZAC sequence group index #2 and the phase offset 0 to be employed in the component carrier #1, the phase offset $2\pi/4$ to be employed in the component carrier #2, and the phase offset $\pi/2$ to be employed in the component carrier #3, and notifies them to the controller 303. Additionally, the component carrier to which the information of the CAZAC sequence group indexes and the phase offsets is notified may be previously decided, and may be written into the control information.

The example 2 is advantageous from a viewpoint of power consumption because the user equipments for performing the carrier aggregation can grasp the CAZAC sequence group indexes being used and the phase offsets when they receive one component carrier. Additionally, the user equipments of LTE can make communication in the component carriers to which the CAZAC sequence groups are notified. At this time, even though the setting of the phase offset is made in one certain component carrier, no phase offset is added with regard to the user equipments of LTE.

Example 3

The example 3 of the first exemplary embodiment will be explained below. The example 3 notifies the CAZAC sequence group index to be commonly employed among all of the component carriers and a difference with the amount of the phase offset to be employed in other component carriers, through one certain component carrier.

Figure 8:
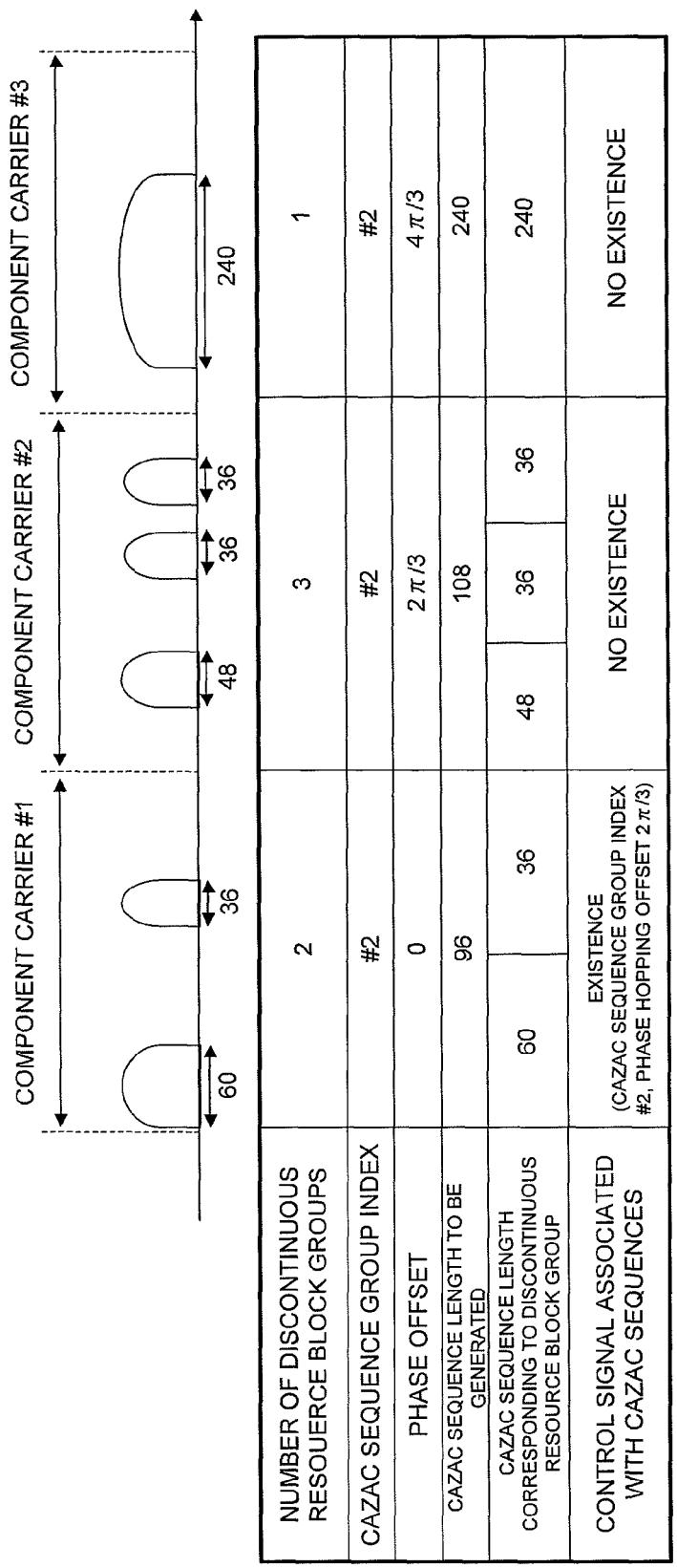
FIG. 8 is a view illustrating the method of transmitting control signals associated with transmission of the CAZAC sequences of an example 3 in the first exemplary embodiment.
Figure 9:
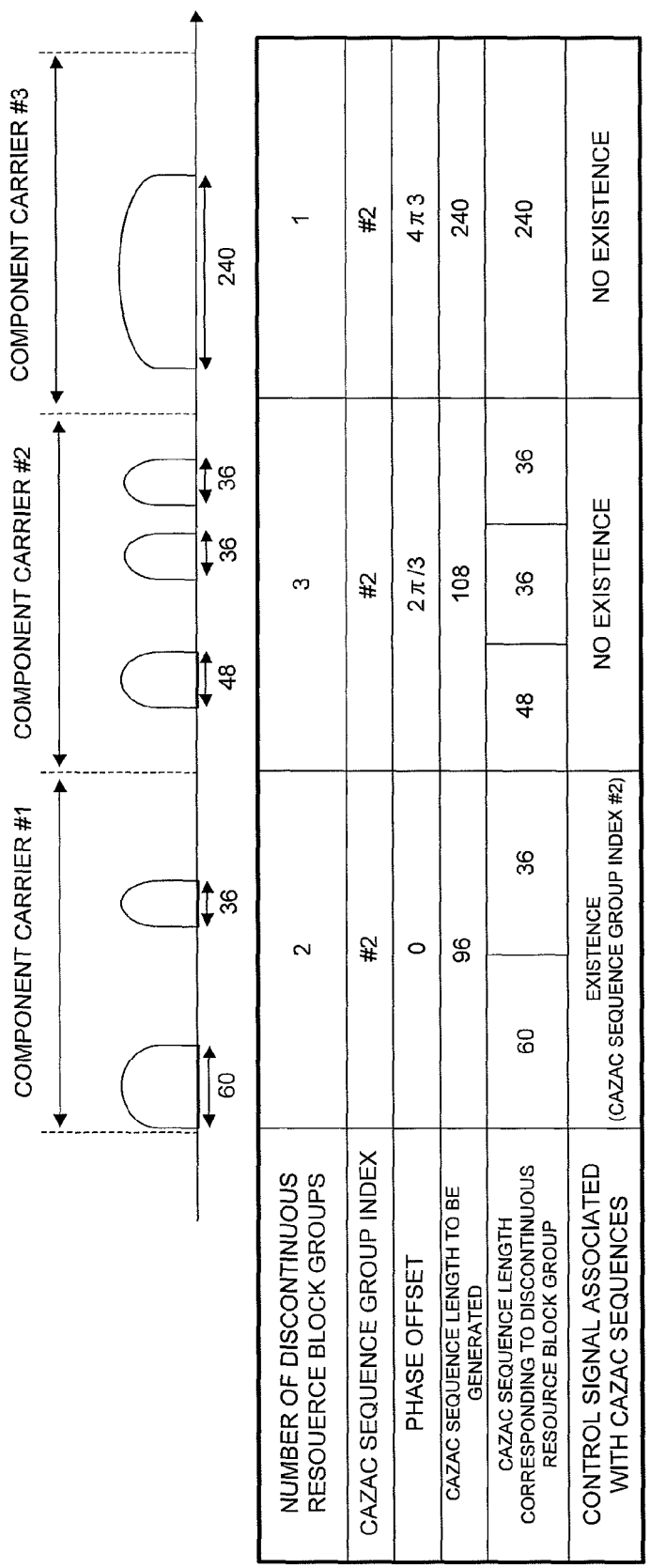
FIG. 9 is a view illustrating the method of transmitting control signals associated with transmission of the CAZAC sequences of the example 4 in the first exemplary embodiment.

The example 3 will be specifically explained by employing FIG. 8. Herein, the case of transmitting the control signals with the component carrier #1 is explained. Thus, the control signal generator 210 of the base station 200 writes downs the CAZAC sequence group index #2 to be commonly employed among the component carriers and $2\pi/3$, being a difference of the phase offset, into the control signals that are transmitted with the resource of PDSCH of the component carrier #1. In this case, $0+2\pi/3=2\pi/3$ and $0+2\pi/3+2\pi/3=4\pi/3$ are used in the component carriers #2 and #3 as the phase offset, respectively.

The control information extractor 302 of the user equipment 300 recognizes the component carriers #1 to #3 that are used in its own station, extracts #2, being the CAZAC sequence group index, and a difference of the phase offset from the control signals of the component carrier #1, and notifies them to the controller 303. This allows the controller 303 to recognize that the CAZAC sequence group index #2 is employed in all of the component carriers, and that the phase offsets to be employed in the component carrier #1, the component carrier #2, and the component carrier #3 are 0, $\pi/4$, and $\pi/2$, respectively. Additionally, the component carriers to which the information of the CAZAC sequence group indexes and the phase offsets is notified may be previously decided, and may be written into the control signals.

In the example 3, similarly to example 2, the user equipments for performing the carrier aggregation can grasp the CAZAC sequence groups being used and the phase offsets when they receive PBCH and PDSCH of one component carrier. For this, the example 3 is advantageous from a viewpoint of power consumption. In addition, in the example 3, the overhead of the control signals associated with the CAZAC sequences can be made small. Further, the user equipments of LTE can make communication in the component carriers to which the CAZAC sequence groups being used are notified. At this time, even though the setting of the phase offset is made in one certain component carrier, no phase offset is added with regard to the user equipments of LTE.

Example 4

The example 4 of the first exemplary embodiment will be explained below. The example 3 notifies the information associated with the CAZAC sequence groups to be used in all of the component carriers that are employed for transmission, through one certain component carrier. Herein, only the CAZAC sequence group index common to the component carriers is notified by employing one certain component carrier.

The example 4 will be specifically explained by employing FIG. 8. Herein, the case of transmitting the control information with the component carrier #1 is explained. Thus, the control signal generator 210 of the base station 200 writes downs #2, being the CAZAC sequence group index to be used in the component carrier #1 into the control signals that are transmitted with the resource of PDSCH of the component carrier #1. In the case of this example, it is necessary to previously define patterns for adding the phase offsets that are used in the component carriers #2 and #3. For example, it is assumed that the phase offset amount to be added carrier by carrier has been previously defined as $2\pi$/(component carrier number) for the base stations and the user equipments. The phase offset amount is $2\pi/3$ because the component carrier number is three. Thus, the controller 303 recognizes that $0+2\pi/3=2\pi/3$ and $0+2\pi/3+2\pi/3=4\pi/3$ are used in the component carriers #2 and #3 as the phase offset, respectively.

The example 4, similarly to the example 2 and the example 3, is advantageous from a viewpoint of power consumption because the user equipments for performing the carrier aggregation can grasp the CAZAC sequence groups being used when they receive PBCH and PDSCH of one component carrier. In addition, in the example 4, the overhead of the control signals associated with the CAZAC sequences can be made small because the phase offset amount is not notified.

Additionally, while the phase offset was changed for each carrier aggregation by a constant amount, and the changed phase offset was added in the above-mentioned explanation, the change amount may not be a constant amount.

While an example of adding the different phase offset for each component carrier was shown in the first exemplary embodiment, a similar effect can be obtained even though a cyclic shift is added instead of the phase offset. Further, the phase offset as well as the cyclic shift may be used together.

The above-mentioned exemplary embodiment makes it possible to employ the signal sequence common to all of the carriers being utilized as the reference signal sequence that differs for each carrier by subjecting the above signal sequence common to all of the carriers to the signal processing that is inherent for each carrier. For this, PAPR can be suppressed.

(A Second Exemplary Embodiment)

In the second exemplary embodiment of the present invention, the CAZAC sequence group common to the component carriers is employed. However, the CAZAC sequence group is characterized in supporting the bandwidths of all of the component carriers with which the transmission is made.

A schematic configuration of the base stations in the second exemplary embodiment is identical to that of the base stations in the first exemplary embodiment shown in FIG. 3, so explanation is omitted.

A schematic configuration of the user equipments in the second exemplary embodiment is almost identical to that of the base stations in the first exemplary embodiment shown in FIG. 4. A difference point is that the phase offset adder 307 does not exist, and that the generated reference signals are directly inputted into the subcarrier mapping units 310-1 to 310-N from the cyclic extender 306. Further, the cyclic extender 306 separates the generated CAZAC sequences into the discontinuous resource block groups of each component carrier.

Figure 10:
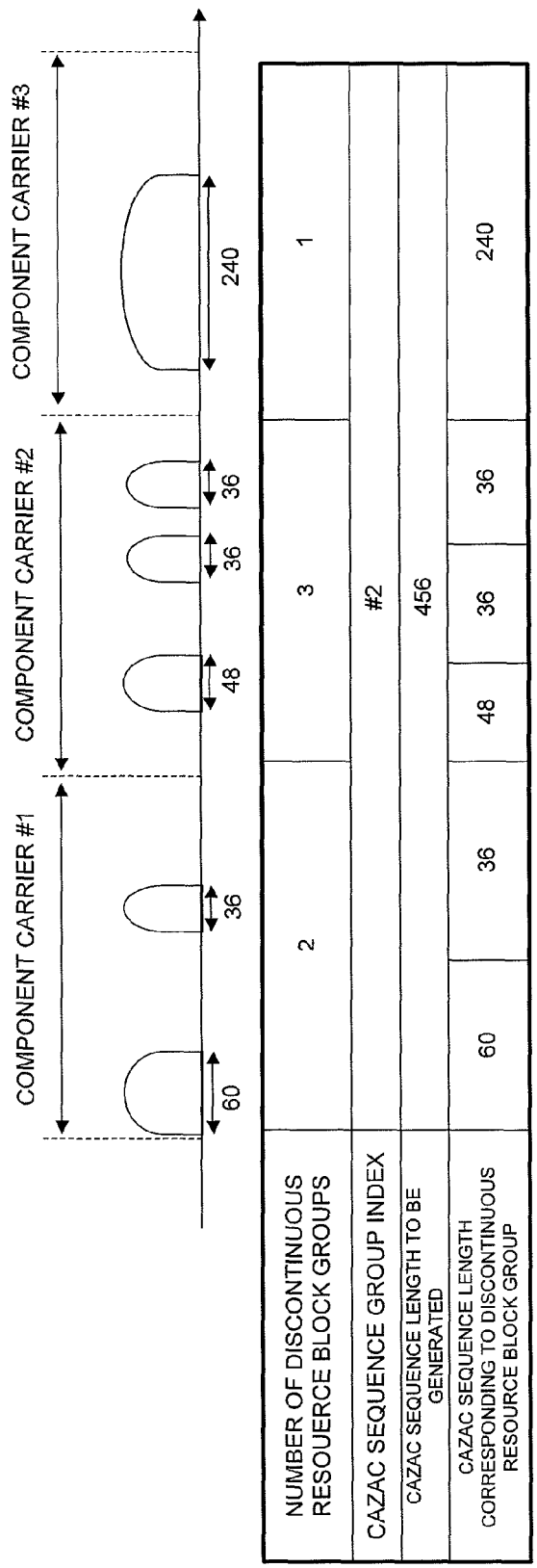
FIG. 10 is a view illustrating the method of transmitting the CAZAC sequences in the second exemplary embodiment.
Figure 16:
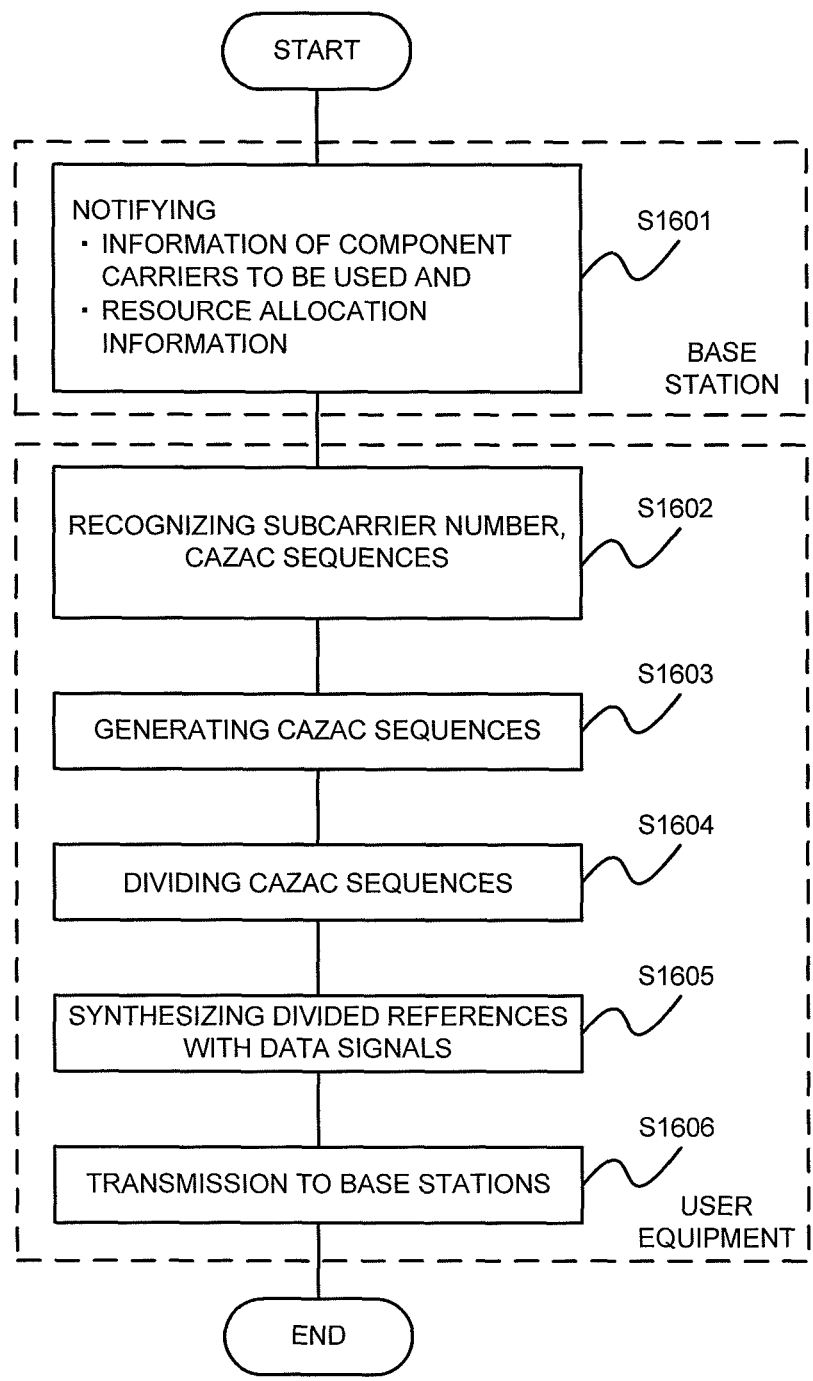
FIG. 16 is a flowchart for explaining an operation of the second exemplary embodiment.

Next, an operation of transmitting the CAZAC sequences associated with the second exemplary embodiment will be explained by employing FIG. 10 and FIG. 16.

The control signal generator 210 of the base stations writes down the information associated with the CAZAC sequence groups and the resource allocation information associated with the resource allocation into the control signals, and transmits them (step S1601).

The user equipments recognize the number of the subcarriers and the CAZAC sequences (step S1602). Herein, the user equipments recognize that control signals received from the base stations indicates that three component carriers #1 to #3 are used in the carrier aggregation. Further, it is assumed that the user equipments has recognized from the resource allocation information that two discontinuous resource block groups of which the continuous resource blocks are 5 and 3 have been allocated to the component carrier #1. Likewise, it is assumed that the user equipments has recognized that three discontinuous resource block groups of which the continuous resource blocks are 4, 3 and 3 have been allocated to the component carrier #2, and one discontinuous resource block group of which the continuous resource block is 20 has been allocated to the component carrier #3. Further, it is assumed that the CAZAC sequence group index of #2 has been sent by the base stations in order to employ the CAZAC sequence group index of #2 that is common to all of the component carriers. However, in the all of the component carriers, it is previously set that the CAZAC sequence corresponding to the bandwidths of the entirety of the subcarrier to be allocated is employed, and is separated into the discontinuous resource block groups of each carrier component.

Specifically, the user equipments generate the CAZAC sequence to be defined within the CAZAC sequence group index #2, of which the sequence length is 456, being the number of the carriers to be allocated to an entirety of the component carrier (step S1603). The cyclic extender 306 sequentially separates the generated CAZAC sequence into six discontinuous resource blocks, being the sequence with a sequence length 60, the sequence with a sequence length 36, the sequence with a sequence length 48, the sequence with a sequence length 36, the sequence with a sequence length 36, the sequence with a sequence length 240, respectively (step S1604). The cyclic extender 306 inputs the reference signals of the separated CAZAC sequences into the subcarrier mapping units 310-1 to 310-N. Each configuration unit performs the processing for the reference signals, and the signal synthesizer 312 synthesizes the processed signals with the data signals (step S1605) and transmits the synthesized signals in an identical band (step S1606).

Additionally, in the second exemplary embodiment, it is necessary to define the CAZAC sequence with a sequence length corresponding to the maximum transmission bandwidth to be supported with the carrier aggregation within each CAZAC sequence group. Thus, the CAZAC sequence length that is defined within the CAZAC sequence group to be employed in the second exemplary embodiment is larger than the CAZAC sequence length that is employed in the first exemplary embodiment.

Example 5

The example 5 of the second exemplary embodiment will be explained below. The example 5 notifies information associated with the CAZAC sequence group to be commonly employed among the component carriers, through PDSCH to be designated by PBCH of each component carrier.

Figure 11:
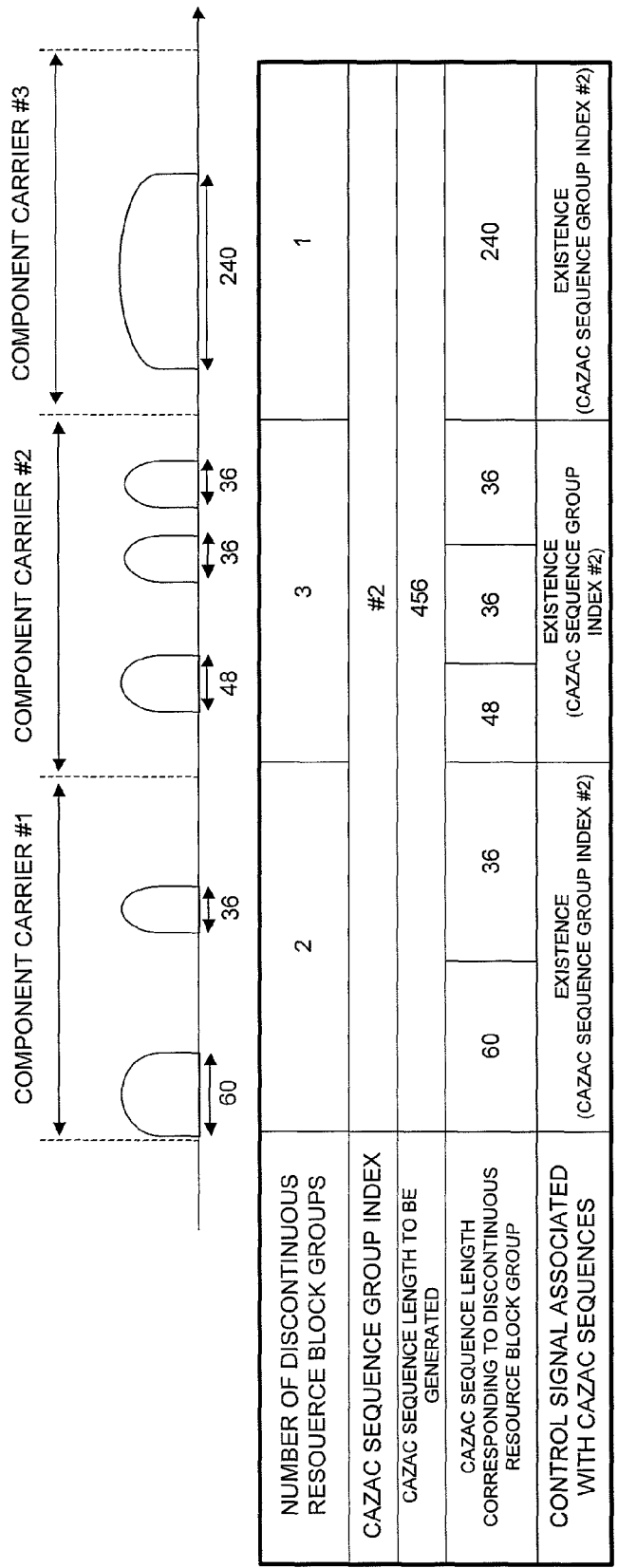
FIG. 11 is a view illustrating the method of transmitting control signals associated with transmission of the CAZAC sequences of an example 5 in the second exemplary embodiment.

The example 5 will be specifically explained by employing FIG. 11. The example 5 notifies the CAZAC sequence group index to be commonly employed with the control signals of each component carrier. For example, the control signal generator 210 of the base station 200 writes down #2, being the CAZAC sequence group index to be commonly used in the component carriers #1, #2, #3, into the control signals that are transmitted with the resource of PDSCH to be designated by PBCH, respectively.

The example 5 is high in commonality with LTE in all of the component carriers. The user equipments of LTE can make communication in all of the component carriers because the example 5, similarly to the current LTE, notifies the CAXZAC sequence group for each component carrier.

Example 6

The example 6 of the second exemplary embodiment will be explained below. The example 6 notifies information associated with the CAZAC sequence group to be commonly employed among the component carriers, through PDSCH to be designated by PBCH of one certain component carrier.

Figure 12:
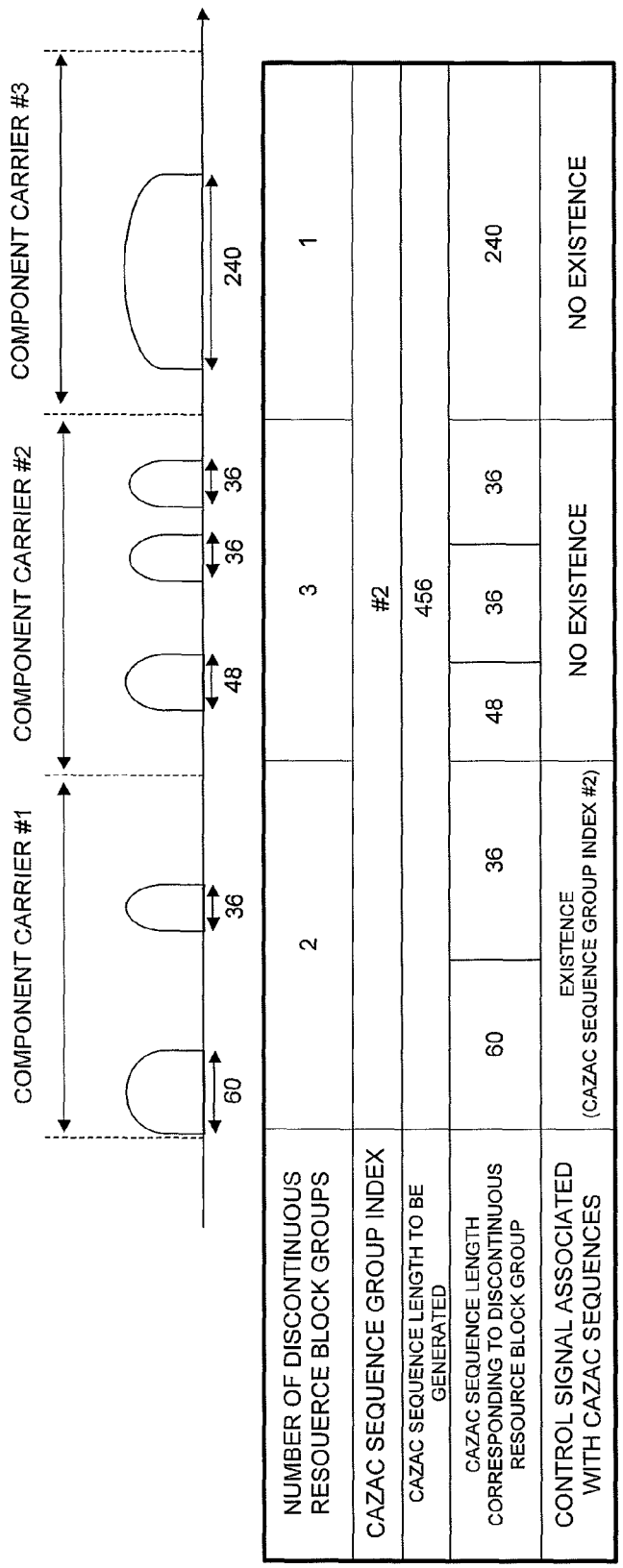
FIG. 12 is a view illustrating the method of transmitting control signals associated with transmission of the CAZAC sequences of an example 6 in the second exemplary embodiment.
Figure 13:
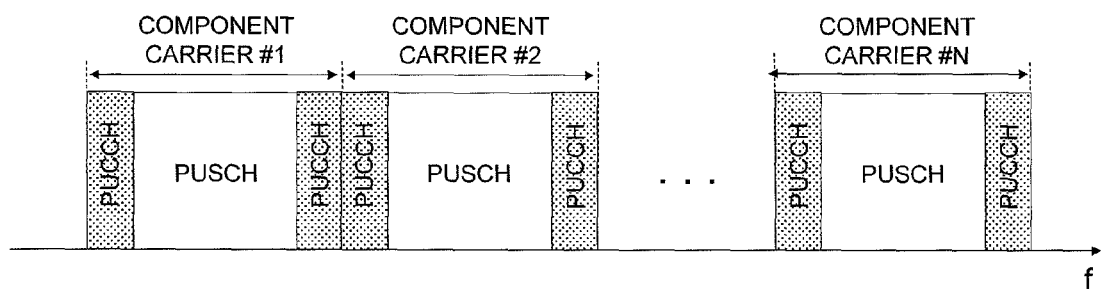
FIG. 13 is a view illustrating a physical channel configuration of LTE-Advanced.

The example 6 will be specifically explained by employing FIG. 12. Herein, the case of sending the information associated with the CAZAC sequence group with the control signals of the component carrier #1 is explained. Thus, in the component carrier #1, #2, being the CAZAC sequence group index to be commonly used is notified respectively. Additionally, in the example 6, the user equipments of LTE make communication by use of the component carrier to which the information associated with the CAZAC sequence groups is sent.

Additionally, while a configuration of employing the signal sequences with sequence lengths in conformity to the bandwidths of the resources of all of the carriers to be utilized was explained in the second exemplary embodiment, a configuration may be employed of employing the signal sequence with a sequence length in conformity to the bandwidth of the resource to be utilized in each carrier, and thereafter separating the above signal sequence when it is possible to use the different signal sequence in each carrier. Further, a configuration may be employed of separating the signal sequence, and thereafter adding the phase, as is the case with the first exemplary embodiment.

This exemplary embodiment makes it possible to make the overhead of the control signals small because information other than the information associated with the CAZAC sequence groups is not notified.

(A Third Exemplary Embodiment)

In the third exemplary embodiment of the present invention, the case in which while a plurality of the component carriers are allocated to the user equipments so that they can make communication by employing a plurality of the component carriers, no carrier aggregation is performed is employed for explanation. Additionally, while the configuration of the first exemplary embodiment is employed for explanation in third exemplary embodiment, an application to the configuration of the second exemplary embodiment may be made.

A schematic configuration of the base stations in the third exemplary embodiment is identical to that of the base stations in the first exemplary embodiment shown in FIG. 3, so explanation is omitted.

A schematic configuration of the user equipments in the third exemplary embodiment is almost identical to that of the base stations in the first exemplary embodiment shown in FIG. 4. A difference point is that, in the third exemplary embodiment, the DFT unit 305, the cyclic extender 306, and the phase offset adder 307 perform, for one component carrier to be used, the processes that they performed for respective component carriers in the first exemplary embodiment.

Additionally, the third exemplary embodiment may perform the process identical to the first exemplary embodiment by inserting 0 (zero) into the reference signals of the component carriers that are not used.

This exemplary embodiment makes it possible to cope with the communication employing a single component carrier and the wireless communication employing a plurality of the component carriers.

Figure 14:
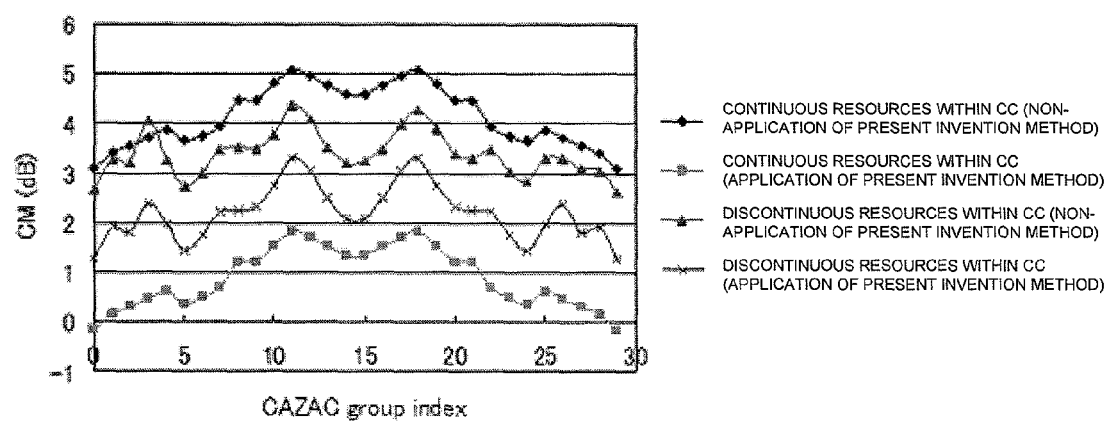
FIG. 14 is a view for explaining effects of the present invention.

The above-mentioned effect of the present invention will be explained by employing FIG. 14. The explanation is made on the condition that the number of the component carriers is two and the number of the subcarriers of each component carrier is 60. A plotting is made in the case of allocating the continuous resources within the component carriers, and in the case of allocating the discontinuous resources within the component carriers (division into the subcarrier number 24 and the subcarrier number 36). It is assumed that the phase offset between the component carriers is zero when the present invention is no applied, and it is assumed that the phase offset between the component carriers is $\pi/2$ when the present invention is applied. It can be seen from FIG. 14 that the present invention makes it possible to reduce Cubic Metric by 3 dB or so at the time of allocating the continuous resources, and by 1 dB or so at the time of allocating the discontinuous resources. Herein Cubic Metric, which is calculated from the amplitude to 3rd power, is an index equivalent to PAPR.

While the uplink was explained in the exemplary embodiments above, the above exemplary embodiments are applicable to the downlink as well. Further, while the configuration in conformity to LTE-advanced was employed for explanation, the configuration is not limited hereto, and the above exemplary embodiments are applicable to the system employing multicarriers such as i-Burst, Wimax, CDMA 2000 3x and MC-HSDPA (Multi Carrier High Speed Downlink Packet Access)

Further, while the transmission employing three component carriers was explained in the exemplary embodiments above, the similar effect can be obtained so long as the number of the component carriers is two or more.

While the CAZAC sequence was employed as the reference signal sequence, the reference signal sequence is not limited hereto, and could be an M sequence, a gold sequence or the like.

Further, while it is also possible that the above-described base stations and terminals of the present invention are configured of hardware, as apparent from the above-mentioned explanation, they can be also realized with a computer program. In the case of such a configuration, a processor that operates under a program filed in a program memory realizes a function and an operation similar to the function and the operation of the above-described exemplary embodiments. Additionally, it is also possible to realize one part of the function of the above-described exemplary embodiments with the computer program.

The present invention makes it possible to cope with the communication employing a single component carrier and the wireless communication employing a plurality of the component carriers. Further, PAPR of the reference signals can be made small because there is no possibility that the identical CAZAC sequence is used among the component carriers when a plurality of the component carriers are employed.

The above-mention present invention is generally applicable to the mobile wireless system for using a plurality of the component carriers.

(Supplementary note 1) A wireless communication system, characterized in including a processing means for, in communication employing a plurality of carriers, performing a signal processing responding to each carrier for a common signal sequence that is employed in the aforementioned plurality of carriers.

(Supplementary note 2) The wireless communication system according to Supplementary note 1, characterized in that the aforementioned processing means performs the aforementioned signal processing in the communication simultaneously employing the plurality of carriers.

(Supplementary note 3) The wireless communication system according to Supplementary note 1 or Supplementary note 2, characterized in that the aforementioned processing means adds at least one of a phase offset and a cyclic shift each of which differs in each carrier.

(Supplementary note 4) The wireless communication system according to one of Supplementary note 1 to Supplementary note 3, characterized in that the aforementioned processing means employs the signal sequence having a sequence length in conformity to a bandwidth of a resource to be utilized in each carrier with regard to the aforementioned signal sequence.

(Supplementary note 5) The wireless communication system according to one of Supplementary note 1 to Supplementary note 3, characterized in that the aforementioned processing means employs the signal sequence having a sequence length in conformity to bandwidths of resources of all of the carriers to be utilized with regard to the aforementioned signal sequence.

(Supplementary note 6) The wireless communication system according to one of Supplementary note 1 to Supplementary note 5, characterized in that the aforementioned processing means subjects the signal sequence to be defined with a format that is notified for each carrier to the signal processing.

(Supplementary note 7) The wireless communication system according to one of Supplementary note 1 to Supplementary note 5, characterized in that the aforementioned processing means subjects the signal sequence to be defined with a format that is notified by a specific carrier to the signal processing.

(Supplementary note 8) The wireless communication system according to one of Supplementary note 1 to Supplementary note 7, characterized in that the aforementioned processing means adds the phase offset or the cyclic shift that is notified for each carrier.

(Supplementary note 9) The wireless communication system according to one of Supplementary note 1 to Supplementary note 7, characterized in that the aforementioned processing means adds the phase offset or the cyclic shift that is notified by a specific carrier.

(Supplementary note 10) The wireless communication system according to one of Supplementary note 1 to Supplementary note 9, characterized in that the aforementioned common signal sequence is defined with the format.

(Supplementary note 11) A base station, characterized in including a processing means for, in communication employing a plurality of carriers, performing a signal processing responding to each carrier for a common signal sequence that is employed in the aforementioned plurality of carriers.

(Supplementary note 12) The base station according to Supplementary note 11, characterized in that the aforementioned processing means performs the aforementioned signal processing in the communication simultaneously employing the plurality of carriers.

(Supplementary note 13) The base station according to Supplementary note 11 or Supplementary note 12, characterized in that the aforementioned processing means adds at least one of a phase offset and a cyclic shift each of which differs in each carrier.

(Supplementary note 14) The base station according to one of Supplementary note 11 to Supplementary note 13, characterized in that the aforementioned processing means employs the signal sequence having a sequence length in conformity to a bandwidth of a resource to be utilized in each carrier with regard to the aforementioned signal sequence.

(Supplementary note 15) The base station according to one of Supplementary note 11 to Supplementary note 13, characterized in that the aforementioned processing means employs the signal sequence having a sequence length in conformity to bandwidths of resources of all of the carriers to be utilized with regard to the aforementioned signal sequence.

(Supplementary note 16) The base station according to one of Supplementary note 11 to Supplementary note 15, characterized in that the aforementioned processing means subjects the signal sequence to be defined with a format that is notified for each carrier to the signal processing.

(Supplementary note 17) The base station according to one of Supplementary note 11 to Supplementary note 15, characterized in that the aforementioned processing means subjects the signal sequence to be defined with a format that is notified by a specific carrier to the signal processing.

(Supplementary note 18) The base station according to one of Supplementary note 11 to Supplementary note 17, characterized in that the aforementioned processing means adds the phase offset or the cyclic shift that is notified for each carrier.

(Supplementary note 19) The base station according to one of Supplementary note 11 to Supplementary note 17, characterized in that the aforementioned processing means adds the phase offset or the cyclic shift that is notified by a specific carrier.

(Supplementary note 20) The base station according to one of Supplementary note 11 to Supplementary note 19, characterized in that the aforementioned common signal sequence is defined with the format.

(Supplementary note 21) A terminal, characterized in including a processing means for, in communication employing a plurality of carriers, performing a signal processing responding to each carrier for a common signal sequence that is employed in the aforementioned plurality of carriers.

(Supplementary note 22) The terminal according to Supplementary note 21, characterized in that the aforementioned processing means performs the aforementioned signal processing in the communication simultaneously employing the plurality of carriers.

(Supplementary note 23) The terminal according to Supplementary note 21 or Supplementary note 22, characterized in that the aforementioned processing means adds at least one of a phase offset and a cyclic shift each of which differs in each carrier.

(Supplementary note 24) The terminal according to one of Supplementary note 21 to Supplementary note 23, characterized in that the aforementioned processing means employs the signal sequence having a sequence length in conformity to a bandwidth of a resource to be utilized in each carrier with regard to the aforementioned signal sequence.

(Supplementary note 25) The terminal according to one of Supplementary note 21 to Supplementary note 23, characterized in that the aforementioned processing means employs the signal sequence having a sequence length in conformity to bandwidths of resources of all of the carriers to be utilized with regard to the aforementioned signal sequence.

(Supplementary note 26) The terminal according to one of Supplementary note 21 to Supplementary note 25, characterized in that the aforementioned processing means subjects the signal sequence to be defined with a format that is notified for each carrier to the signal processing.

(Supplementary note 27) The terminal according to one of Supplementary note 21 to Supplementary note 25, characterized in that the aforementioned processing means subjects the signal sequence to be defined with a format that is notified by a specific carrier to the signal processing.

(Supplementary note 28) The terminal according to one of Supplementary note 21 to Supplementary note 27, characterized in that the aforementioned processing means adds the phase offset or the cyclic shift that is notified for each carrier.

(Supplementary note 29) The terminal according to one of Supplementary note 21 to Supplementary note 27, characterized in that the aforementioned processing means adds the phase offset or the cyclic shift that is notified by a specific carrier.

(Supplementary note 30) The terminal according to one of Supplementary note 21 to Supplementary note 29, characterized in that the aforementioned common signal sequence is defined with the format.

(Supplementary note 31) A wireless communication method, characterized in including a processing step of, in communication employing a plurality of carriers, performing a signal processing responding to each carrier for a common signal sequence that is employed in the aforementioned plurality of carriers.

(Supplementary note 32) The wireless communication method according to Supplementary note 31, characterized in that the aforementioned processing step performs the aforementioned signal processing in the communication simultaneously employing the plurality of carriers.

(Supplementary note 33) The wireless communication method according to Supplementary note 31 or Supplementary note 32, characterized in that the aforementioned processing step adds at least one of a phase offset and a cyclic shift each of which differs in each carrier.

(Supplementary note 34) The wireless communication method according to one of Supplementary note 31 to Supplementary note 33, characterized in that the aforementioned processing step employs the signal sequence having a sequence length in conformity to a bandwidth of a resource to be utilized in each carrier with regard to the aforementioned signal sequence.

(Supplementary note 35) The wireless communication method according to one of Supplementary note 31 to Supplementary note 33, characterized in that the aforementioned processing step employs the signal sequence having a sequence length in conformity to bandwidths of resources of all of the carriers to be utilized with regard to the aforementioned signal sequence.

(Supplementary note 36) The wireless communication method according to one of Supplementary note 31 to Supplementary note 35, characterized in that the aforementioned processing step subjects the signal sequence to be defined with a format that is notified for each carrier to the signal processing.

(Supplementary note 37) The wireless communication method according to one of Supplementary note 31 to Supplementary note 35, characterized in that the aforementioned processing step subjects the signal sequence to be defined with a format that is notified by a specific carrier to the signal processing.

(Supplementary note 38) The wireless communication method according to one of Supplementary note 31 to Supplementary note 37, characterized in that the aforementioned processing step adds the phase offset or the cyclic shift that is notified for each carrier.

(Supplementary note 39) The wireless communication method according to one of Supplementary note 31 to Supplementary note 37, characterized in that the aforementioned processing step adds the phase offset or the cyclic shift that is notified by a specific carrier.

(Supplementary note 40) The wireless communication method according to one of Supplementary note 31 to Supplementary note 39, characterized in that the aforementioned common signal sequence is defined with the format.

(Supplementary note 41) A program of a base station, characterized in causing the aforementioned base station to execute, in communication employing a plurality of carriers, a signal processing responding to each carrier for a common signal sequence that is employed in the aforementioned plurality of carriers.

(Supplementary note 42) A program of a terminal, characterized in causing the aforementioned terminal to execute, in communication employing a plurality of carriers, a signal processing responding to each carrier for a common signal sequence that is employed in the aforementioned plurality of carriers.

REFERENCE SIGNS LIST 200 base station
201 wireless communication unit 202 controller
203 cyclic prefix remover
204 IFFT unit
205 subcarrier demapping unit
206 channel estimator
207 frequency equalizer
208 IDFT unit
209 data signal demodulator
210 control signal generator
300 user equipment
301 wireless communication unit
302 control information extractor
303 controller
304 CAZAC sequence number generator
305 DFT unit
306 cyclic extender
307 phase offset adder
308 data signal generator
309 DFT unit
310 subcarrier mapping unit
311 IFFT unit
312 signal synthesizer
313 cyclic prefix adder

The invention claimed is:

1. A wireless communication system, comprising:
a processing means for, in communication employing a plurality of component carriers for performing carrier aggregation, generating a signal sequence having a predetermined length defined by information associated with a common signal sequence group that is employed in said plurality of component carriers transmitted from a base station, based on resource allocation information allocated to said plurality of component carriers, and applying a signal processing responding to each component carrier to the signal sequence having said predetermined length to output a reference signal for each of said plurality of component carriers: and
means for synthesizing a data signal generated for each of said plurality of component carriers with said output reference signal,
wherein said processing means adds at least one of a phase offset and a cyclic shift each of which differs in each carrier.

2. A wireless communication system according to claim 1, wherein said processing means performs said signal processing in the communication simultaneously employing the plurality of carriers.

3. A wireless communication system according to claim 1, wherein said processing means employs the signal sequence having a sequence length in conformity to a bandwidth of a resource to be utilized in each carrier with regard to said signal sequence.

4. A wireless communication system according to claim 1, wherein said processing means employs the signal sequence having a sequence length in conformity to bandwidths of resources of all of the carriers to be utilized with regard to said signal sequence.

5. A wireless communication system according to claim 1, wherein said processing means subjects the signal sequence to be defined with a format that is notified for each carrier to the signal processing.

6. A wireless communication system according to claim 1, wherein said processing means subjects the signal sequence to be defined with a format that is notified by a specific carrier to the signal processing.

7. A wireless communication system according to claim 1, wherein said processing means adds the phase offset or the cyclic shift that is notified for each carrier.

8. A wireless communication system according to claim 1, wherein said processing means adds the phase offset or the cyclic shift that is notified by a specific carrier.

9. A wireless communication system according to claim 1, wherein said common signal sequence is defined with the format.

10. Abuse station, comprising a processing means for, in communication employing a plurality of component carriers for performing carrier aggregation, generating a signal sequence having a predetermined length defined by information associated with a common signal sequence group that is employed in said plurality of component carriers transmitted from a base station, based on resource allocation information allocated to said plurality of component, and applying a signal processing responding to each component carrier to the signal sequence having said predetermined length to output a reference signal for each of said plurality of component carriers; and
means for synthesizing a data signal generated for each of said plurality of component carriers with said output reference signal,
wherein said processing means adds at least one of a phase offset and a cyclic shift each of which differs in each carrier.

11. A base station according to claim 10, wherein said processing means performs said signal processing in the communication simultaneously employing the plurality of carriers.

12. A base station according to claim 10, wherein said processing means employs the signal sequence having a sequence length in conformity to a bandwidth of a resource to be utilized in each carrier with regard to said signal sequence.

13. A base station according to claim 10, wherein said processing means employs the signal sequence having a sequence length in conformity to bandwidths of resources of all of the carriers to be utilized with regard to said signal sequence.

14. A base station according to claim 10, wherein said processing means subjects the signal sequence to be defined with a format that is notified for each carrier to the signal processing.

15. A base station according to claim 10, wherein said processing means subjects the signal sequence to be defined with a format that is notified by a specific carrier to the signal processing.

16. Abuse station according to claim 10, wherein said processing means adds the phase offset or the cyclic shift that is notified for each carrier.

17. A base station according to claim 10, wherein said processing means adds the phase offset or the cyclic shift that is notified by a specific carrier.

18. A base station according to claim 10, wherein said common signal sequence is defined with the format.

19. A terminal, comprising a processing means for, in communication employing a plurality of component carriers for performing carrier aggregation, generating a signal sequence having a predetermined length defined by information associated with a common signal sequence group that is employed in said plurality of component carriers transmitted from a base station, based on resource allocation information allocated to said plurality of component carriers, and applying a signal processing responding to each component carrier to the signal sequence having said predetermined length to output a reference signal for each of said plurality of component carriers; and means for synthesizing a data sign, generated for each of said plurality of component carriers with said output reference signal, wherein said processing means adds at least one of a phase offset and a cyclic shift each of which differs in each carrier.

20. A terminal according to claim 19, wherein said processing means performs said signal processing in the communication simultaneously employing the plurality of carriers.

21. A terminal according to claim 19, wherein said processing means employs the signal sequence having a sequence length in conformity to a bandwidth of a resource to be utilized in each carrier with regard to said signal sequence.

22. A terminal according to claim 19, wherein said processing means employs the signal sequence having a sequence length in conformity to bandwidths of resources of all of the carriers to be utilized with regard to said signal sequence.

23. A terminal according to claim 19, wherein said processing means subjects the signal sequence to be defined with a format that is notified for each carrier to the signal processing.

24. A terminal according to claim 19, wherein said processing means subjects the signal sequence to be defined with a format that is notified by a specific carrier to the signal processing.

25. A terminal according to claim 19, wherein said processing means adds the phase offset or the cyclic shift that is notified for each carrier.

26. A terminal according to claim 19, wherein said processing means adds the phase offset or the cyclic shift that is notified by a specific carrier.

27. A terminal according to claim 19, wherein said common signal sequence is defined with the format.

28. A wireless communication method, comprising a processing step of, in communication employing a plurality of component carriers for performing carrier aggregation, generating a signal sequence having a predetermined length defined by information associated with a common signal sequence group that is employed in said plurality of component carriers transmitted from a base station, based on resource allocation information allocated to said plurality of component carriers, and applying a signal processing responding to each component carrier to the signal sequence having said predetermined length to output a reference signal for each of said plurality of component carriers; and a step of synthesizing a data signal generated for each of said plurality of component carriers with said output reference signal, wherein said signal processing adds at least one of a phase offset and a cyclic shift each of which differs in each carrier.

29. A wireless communication method according to claim 28, wherein said processing step performs said signal processing in the communication simultaneously employing the plurality of carriers.

30. A wireless communication method according to claim 28, wherein said processing step employs the signal sequence having a sequence length in conformity to a bandwidth of a resource to be utilized in each carrier with regard to said signal sequence.

31. A wireless communication method according to claim 28, wherein said processing step employs the signal sequence having a sequence length in conformity to bandwidths of resources of all of the carriers to be utilized with regard to said signal sequence.

32. A wireless communication method according to claim 28, wherein said processing step subjects the signal sequence to be defined with a format that is notified for each carrier to the signal processing.

33. A wireless communication method according to claim 28, wherein said processing step subjects the signal sequence to be defined with a format that is notified by a specific carrier to the signal processing.

34. A wireless communication method according to claim 28, wherein said processing step adds the phase offset or the cyclic shift that is notified for each carrier.

35. A wireless communication method according to claim 28, wherein said processing step adds the phase offset or the cyclic shift that is notified by a specific carrier.

36. A wireless communication method according to claim 28, wherein said common signal sequence is defined with the format.

37. A non-transitory computer-readable recording medium with a program of a base station recorded thereon, said program causing said base station to execute, in communication employing a plurality of component carriers, performing carrier aggregation, generating a signal sequence having a predetermined length defined by information associated with a common signal sequence group that is employed in said plurality of component carriers transmitted from a base station, based on resource allocation information allocated to said plurality of component carriers, and applying a signal processing responding to each component carrier to the signal sequence having said predetermined length to output a reference signal for each of said plurality of component carriers; and synthesizing a data signal generated for each of said plurality of component carriers with said output reference signal, wherein said signal processing adds at least one of a phase offset and a cyclic shift each of which differs in each carrier.

38. A non-transitory computer-readable recording medium with a program of a terminal recorded thereon, said program causing said terminal to execute, in communication employing a plurality of component carriers, performing carrier aggregation, generating a signal sequence having a predetermined length defined by information associated with a common signal sequence group that is employed in said plurality of component carriers transmitted from a base station, based on resource allocation information allocated to said plurality of component carriers, and applying a signal processing responding to each component carrier to the signal sequence having said predetermined length to output a reference signal for each of said plurality of component carriers; and synthesizing a data signal generated for each of said plurality of component carriers with said output reference signal, wherein said signal processing adds at least one of a phase offset and a cyclic shift each of which differs in each carrier.

* * * * *

UNITED STATES PATENT AND TRADEMARK OFFICE
CERTIFICATE OF CORRECTION

PATENT NO. : 8,953,533 B2  
APPLICATION NO. : 13/257809  
DATED : February 10, 2015  
INVENTOR(S) : Takamichi Inoue, Kenji Koyanagi and Yoshikazu Kakura Page 1 of 1

It is certified that error appears in the above-identified patent and that said Letters Patent is hereby corrected as shown below:

In the specification  
Column 10, Line 34: Delete "$2\pi/4$" and insert -- $\pi/4$ --

In the claims  
Column 20, Line 10: In Claim 10, delete "Abuse" and insert -- A base --  
Column 20, Line 18: In Claim 10, delete "component," and insert -- component carriers, --  
Column 20, Line 51: In Claim 16, delete "Abuse" and insert -- A base --  
Column 20, Line 62: In Claim 19, delete "haying" and insert -- having --  
Column 21, Line 1: In Claim 19, delete "haying" and insert -- having --  
Column 21, Line 4: In Claim 19, delete "sign," and insert -- signal --  
Column 21, Line 42: In Claim 28, delete "haying" and insert -- having --  
Column 21, Line 49: In Claim 28, delete "haying" and insert -- having --  
Column 22, Line 28: In Claim 37, delete "haying" and insert -- having --  
Column 22, Line 49: In Claim 38, delete "haying" and insert -- having --

Signed and Sealed this  
Fifth Day of January, 2016

Michelle K. Lee  
*Director of the United States Patent and Trademark Office*